United States Patent
Chaponniere et al.

(10) Patent No.: US 10,701,587 B2
(45) Date of Patent: Jun. 30, 2020

(54) POLICY PROVISIONING AT A USER EQUIPMENT (UE)

(71) Applicant: QUALCOMM Incorporated, San Diego, CA (US)

(72) Inventors: Lenaig Genevieve Chaponniere, La Jolla, CA (US); Santosh Abraham, San Diego, CA (US); Stefano Faccin, San Ysidro, CA (US); Hong Cheng, Bridgewater, NJ (US); Haris Zisimopoulos, London (GB); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/158,206

(22) Filed: Oct. 11, 2018

(65) Prior Publication Data

US 2019/0116520 A1    Apr. 18, 2019

Related U.S. Application Data

(60) Provisional application No. 62/572,524, filed on Oct. 15, 2017.

(51) Int. Cl.
*H04W 28/06* (2009.01)
*H04L 1/00* (2006.01)
(Continued)

(52) U.S. Cl.
CPC .......... *H04W 28/06* (2013.01); *H04L 1/0072* (2013.01); *H04L 5/0044* (2013.01); *H04W 4/20* (2013.01);
(Continued)

(58) Field of Classification Search
CPC ......... H04W 28/06; H04W 8/00; H04W 4/20; H04W 8/24; H04W 28/0268;
(Continued)

(56) References Cited

U.S. PATENT DOCUMENTS 9,516,577 B2   12/2016   Punz et al.
2012/0246697 A1*   9/2012   Sedlacek ............... H04L 63/102
                                                      726/1
(Continued)

OTHER PUBLICATIONS

3rd Generation Partnership Project; Technical Specification Group Services and System Aspects; Architecture Enhancements for Non-3GPP Accesses (Release 11), 3GPP Standard; Technical Specification; 3GPP TS 23.402, 3rd Generation Partnership Project (3GPP), Mobile Competence Centre; 650, Route Des Lucioles; F-06921 Sophia-Antipolis Cedex; France, vol. SA WG2, No. V11.10.0, Dec. 5, 2014, pp. 1-253, XP051294044.

(Continued)

*Primary Examiner* — Brandon J Miller
(74) *Attorney, Agent, or Firm* — Loza & Loza, LLP

(57) ABSTRACT

Aspects of the disclosure relate to a method of operating a user equipment for wireless communication with a network. In some aspects, the UE establishes a connection to a network and obtains a control plane message from the network. The control plane message may include one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message, or a combination thereof. Other aspects, embodiments, and features are also claimed and described.

32 Claims, 20 Drawing Sheets

(51) Int. Cl.
*H04L 5/00* (2006.01)
*H04W 4/20* (2018.01)
*H04W 8/24* (2009.01)
*H04W 28/02* (2009.01)
*H04W 72/04* (2009.01)

(52) U.S. Cl.
CPC ....... *H04W 8/245* (2013.01); *H04W 28/0215* (2013.01); *H04W 28/0268* (2013.01); *H04W 72/042* (2013.01)

(58) Field of Classification Search
CPC ............ H04W 72/042; H04W 28/0215; H04L 1/0072; H04L 5/0044; H04L 5/0048; H04L 5/001
See application file for complete search history.

(56) References Cited

U.S. PATENT DOCUMENTS

| | | | | |
|---|---|---|---|---|
| 2014/0287746 | A1* | 9/2014 | Faccin | H04W 48/18 455/433 |
| 2017/0374608 | A1* | 12/2017 | Li | H04W 48/08 |
| 2018/0288659 | A1* | 10/2018 | Jamadagni | H04W 4/06 |
| 2019/0141081 | A1* | 5/2019 | Kunz | H04W 4/70 |

OTHER PUBLICATIONS

International Search Report and Written Opinion—PCT/US2018/055669—ISA/EPO—dated Jan. 4, 2019.

* cited by examiner

| Policy type | Receiver of policy rules from PCF | Enforcement | Involved Reference Points/Interface |
|---|---|---|---|
| QoS | SMF | UPF, RAN, UE | Npcf/N7: PCF → SMF<br>N4: SMF → UPF<br>N2: SMF → RAN/AMF<br>N1: AMF/SMF → UE |
| Packet inspection | SMF | UPF | Npcf/N7: PCF → SMF<br>N4: SMF → UPF |
| Packet routing and forwarding | SMF | UPF | Npcf/N7: PCF → SMF<br>N4: SMF → UPF |
| Traffic usage reporting | SMF | UPF | Npcf/N7: PCF → SMF<br>N4: SMF → UPF |
| Traffic steering control | SMF | UPF | Npcf/N7: PCF → SMF<br>N4: SMF → UPF |
| Congestion management | -- | -- | -- |
| Mobility restrictions (MOD); Service area restrictions | AMF | AMF, RAN, UE | Npcf/N15: PCF → AMF<br>N2: AMF → RAN<br>N1: AMF → UE |
| RAT/Frequency selection priority | AMF | RAN | Npcf/N15: PCF → AMF<br>N2: AMF → RAN |
| Access network discovery and selection policy | UE | UE | Npcf/Namf: PCF → AMF<br>N1: AMF → UE |
| UE route selection policy | AMF | UE | Npcf/N15: PCF → AMF<br>N1: AMF → UE |

FIG. 8

DL NAS Transport Message Contents

| Information Element | Type | Presence | Format | Length |
|---|---|---|---|---|
| Extended protocol discriminator | Extended protocol discriminator | M | V | 1 |
| Security header type | Security header type | M | V | 1/2 |
| Spare half octet | Spare half octet | M | V | 1/2 |
| DL NAS Transport message identity | Message type | M | V | 1 |
| Payload container | Payload container | M | TLV-E | 4-65538 |
| Payload information | Payload information | M | TLV | 3-n |

FIG. 9

POLICY PROVISIONING AT A USER EQUIPMENT (UE)

PRIORITY CLAIM

This application claims priority to and the benefit of U.S. Provisional Application No. 62/572,524 filed in the U.S. patent office on Oct. 15, 2017, the entire content of which is incorporated herein by reference as if fully set forth below in its entirety and for all applicable purposes.

TECHNICAL FIELD

The technology discussed below relates generally to wireless communication systems, and more particularly, for policy provisioning at a user equipment (UE).

INTRODUCTION

In wireless communication systems, the network may control the behavior of user equipments (UEs) using various types of policy information. For example, the network may define a route selection policy (also referred to as a UE route selection policy (URSP)) for the UE and the UE may apply the URSP to determine how to route outgoing traffic (e.g., to an existing protocol data unit (PDU) session or to a new PDU session). In some scenarios, for example, the network may need to update such policies being implemented by the UE due to changing network conditions or to improve UE performance. However, in some circumstances, conventional approaches for delivering such updated policy information to the UE may not be adequate or efficient.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for wireless communication is disclosed. The method may be performed by a user equipment (UE). The method includes establishing a connection to a network and obtaining a control plane message from the network. The control plane message may include one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message.

In one example, an apparatus (e.g., a UE) for wireless communication with a network is disclosed. The apparatus includes a processor, a transceiver communicatively coupled to the processor, and a memory communicatively coupled to the processor. The processor may be configured to establish a connection to the network and obtain a control plane message from the network. The control plane message may include one or more types of policy information if a size of the one or more types of policy information is less than or equal to a maximum payload size of the control plane message, or information indicating at least a network location from where the one or more types of policy information may be obtained by the apparatus over a user plane if the size of the one or more types of policy information is greater than the maximum payload size of the control plane message.

In one example, an apparatus (e.g., a UE) for wireless communication with a network is disclosed. The apparatus includes means for establishing a connection to a network and means for obtaining a control plane message from the network. The control plane message may include one or more types of policy information if a size of the one or more types of policy information is less than or equal to a maximum payload size of the control plane message, or information indicating at least a network location from where the one or more types of policy information may be obtained by the apparatus over a user plane if the size of the one or more types of policy information is greater than the maximum payload size of the control plane message.

In one example, a non-transitory computer-readable medium storing computer-executable code is disclosed. The non-transitory computer-readable medium may include code for causing a computer to establish a connection to the network and to obtain a control plane message from the network. The control plane message may include one or more types of policy information if a size of the one or more types of policy information is less than or equal to a maximum payload size of the control plane message, or information indicating at least a network location from where the one or more types of policy information may be obtained by the apparatus over a user plane if the size of the one or more types of policy information is greater than the maximum payload size of the control plane message.

In one example a method for wireless communication is disclosed. The method may be performed by a UE. The method includes establishing a connection to a server based on a network location preconfigured at the UE, obtaining one or more types of policy information from the server; and updating at least one policy based on the obtained one or more types of policy information.

In one example, an apparatus (e.g., a UE) for wireless communication with a network is disclosed. The apparatus includes a processor, a transceiver communicatively coupled to the processor, and a memory communicatively coupled to the processor. The processor may be configured to establish a connection to a server based on a network location preconfigured at the apparatus, obtain one or more types of policy information from the server, and update at least one policy based on the obtained one or more types of policy information.

In one example, an apparatus (e.g., a UE) for wireless communication with a network is disclosed. The apparatus includes means for establishing a connection to a server based on a network location preconfigured at the apparatus, means for obtaining one or more types of policy information from the server, and means for updating at least one policy based on the obtained one or more types of policy information.

In one example, a non-transitory computer-readable medium storing computer-executable code is disclosed. The non-transitory computer-readable medium may include code for causing a computer to establish a connection to a server based on a network location preconfigured at the apparatus, obtain one or more types of policy information from the server, and update at least one policy based on the obtained one or more types of policy information.

In one example, a method for wireless communication is disclosed. The method may be performed by a core network device (e.g., a server) configured to implement a policy control function. The method includes establishing a connection with a user equipment (UE), and transmitting, to the UE, a control plane message. The control plane message may include one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message.

In one example, an apparatus for wireless communication with a network is disclosed. For example, the apparatus may be a core network device (e.g., a server) configured to implement a policy control function. The apparatus includes a processor, a transceiver communicatively coupled to the processor, and a memory communicatively coupled to the processor. The processor may be configured to establish a connection with a UE, and transmit, to the UE, a control plane message. The control plane message may include one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message.

In one example, an apparatus for wireless communication with a network is disclosed. For example, the apparatus may be a core network device (e.g., a server) configured to implement a policy control function. The apparatus includes means for establishing a connection with a UE, and means for transmitting, to the UE, a control plane message. The control plane message may include one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message.

In one example, a non-transitory computer-readable medium storing computer-executable code is disclosed. The non-transitory computer-readable medium may include code for causing a computer to establish a connection with a UE, and transmit, to the UE, a control plane message. The control plane message may include one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 illustrates an exemplary table listing several types of policy information that may be delivered to a user equipment (UE) in accordance with various aspects of the disclosure.

FIG. 9 illustrates an example of a downlink (DL) NAS transport message for delivering policy information.

DETAILED DESCRIPTION

Figure 1:
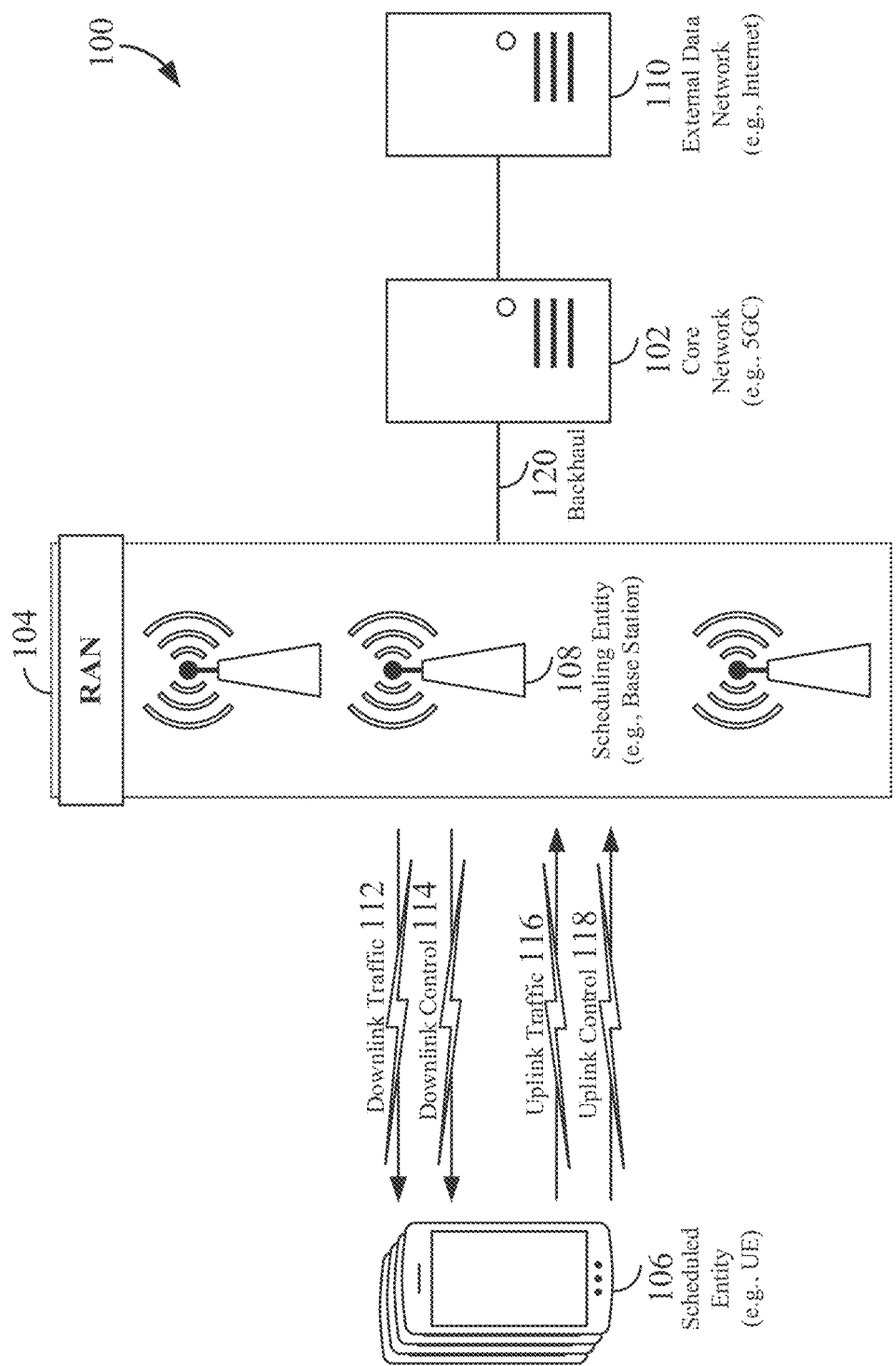
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

A radio access technology (RAT) may, for example, correspond to a type of technology or communication standard that may be utilized for radio access and communication over a wireless air interface. Just a few examples of RATs include GSM, UTRA, E-UTRA (LTE), Bluetooth, and Wi-Fi. The term new radio (NR) may generally refer to the new radio access technology (e.g., 5G technology) undergoing definition and standardization by 3GPP in Release 15.

The term access stratum may, for example, generally refer to a functional grouping consisting of the parts in the radio access network and in the UE, and the protocols between these parts being specific to the access technique (i.e., the way the specific physical media between the UE and the radio access network is used to carry information). The term non-access stratum (NAS) may, for example, generally refer to protocols between the UE and the core network that are not terminated in the radio access network.

The term quality of service (QoS) may, for example, generally refer to a collective effect of service performances which determine the degree of satisfaction of a user of a service. QoS may be characterized by the combined aspects of performance factors applicable to all services, such as: service operability performance; service accessibility performance; service retainability performance; service integrity performance; and other factors specific to each service.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
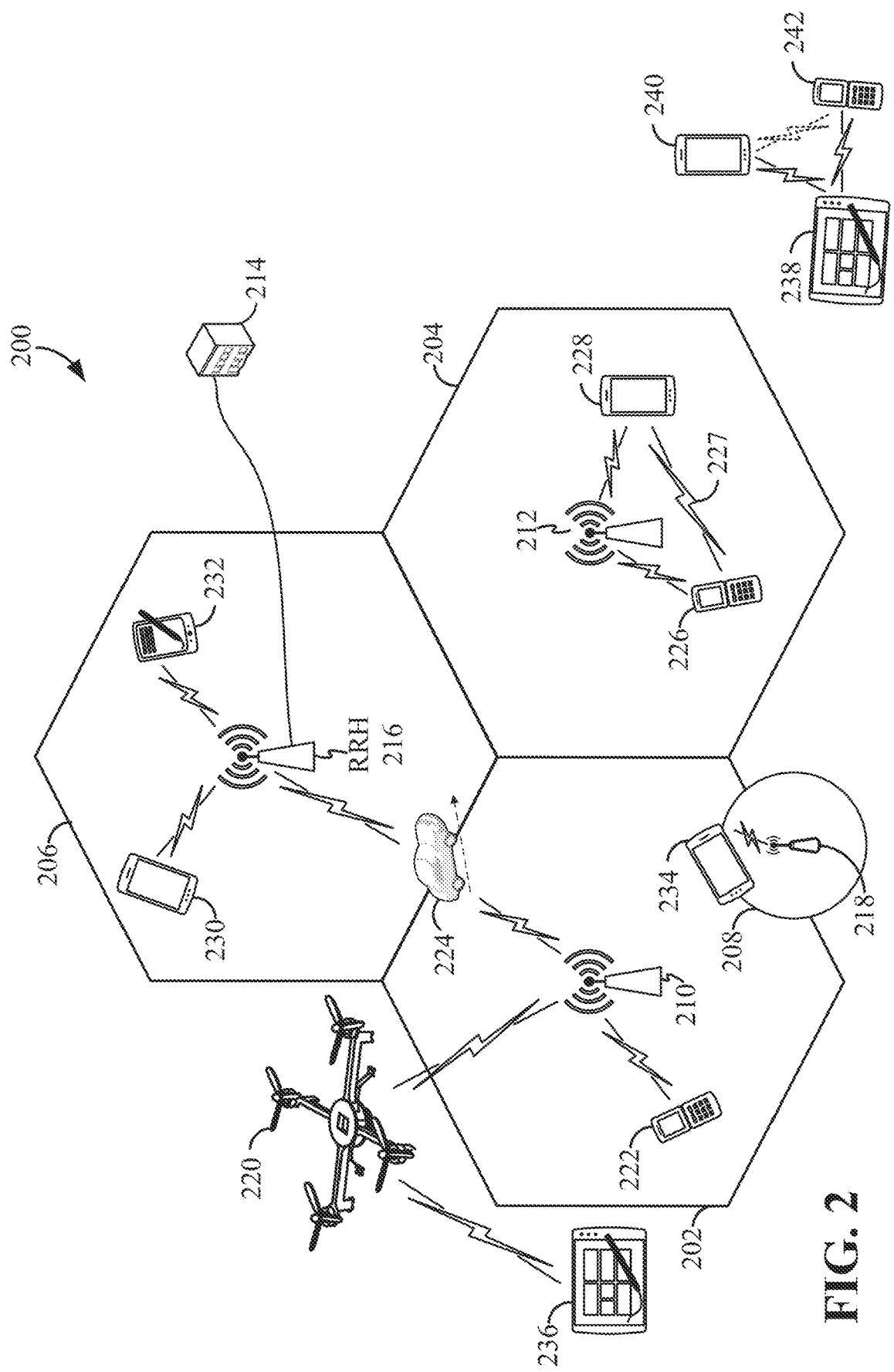
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell.

Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Figure 3:
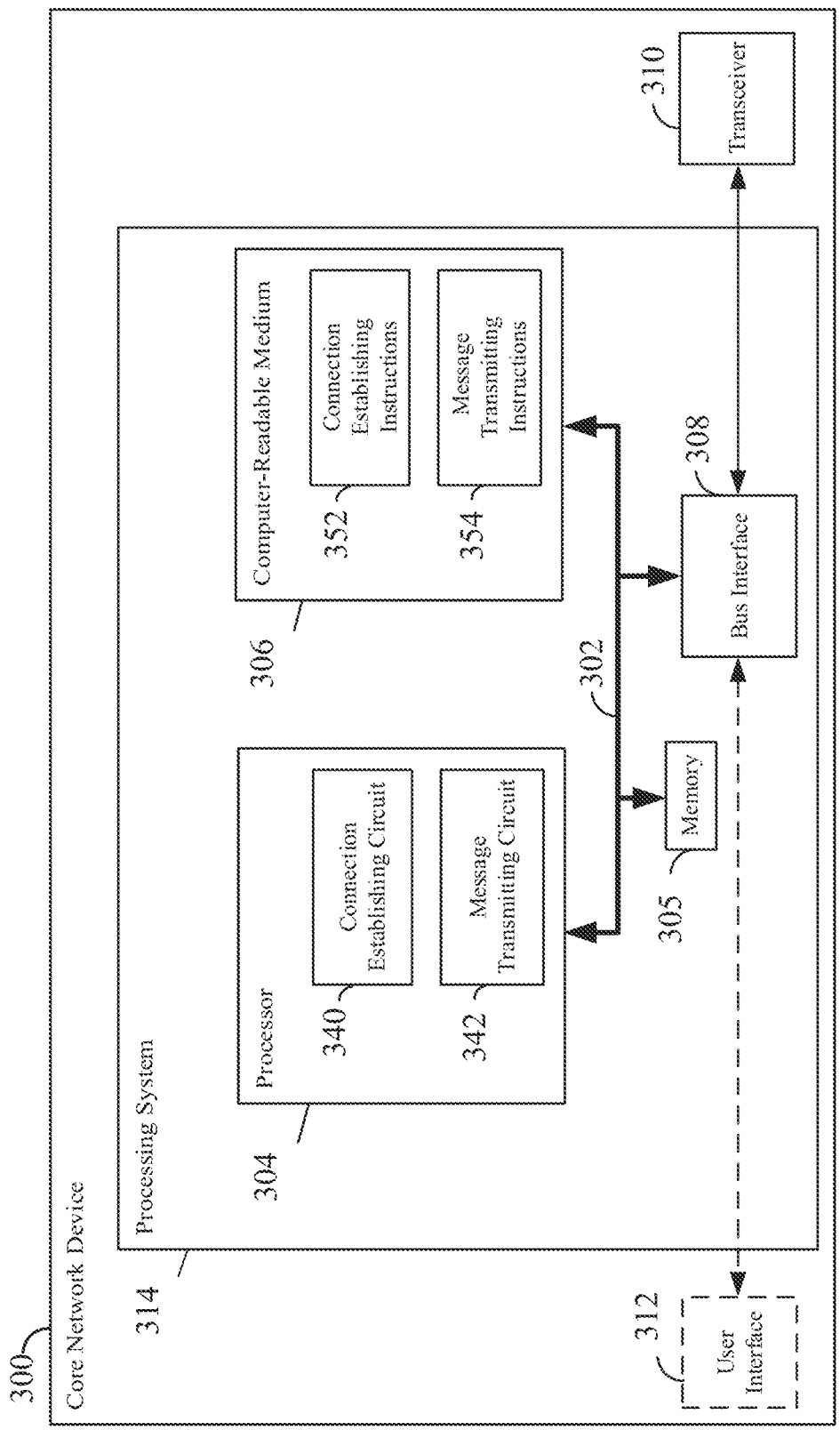
FIG. 3 is a block diagram conceptually illustrating an example of a hardware implementation for a core network device according to some aspects of the disclosure.
Figure 5:
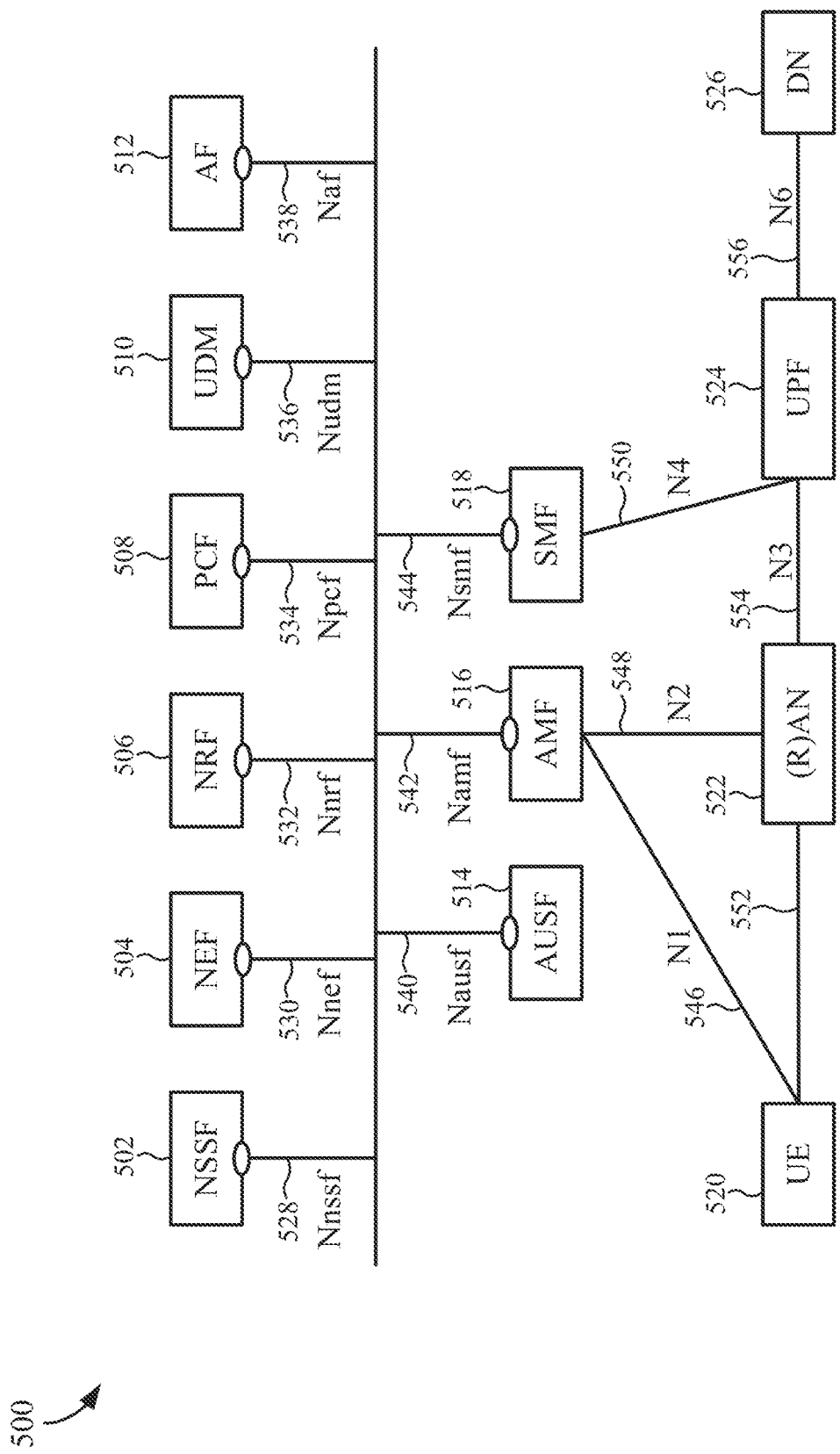
FIG. 5 illustrates an example of a potential 5G system architecture in service-based interface representation for a non-roaming scenario in accordance with various aspects of the disclosure.
Figure 6:
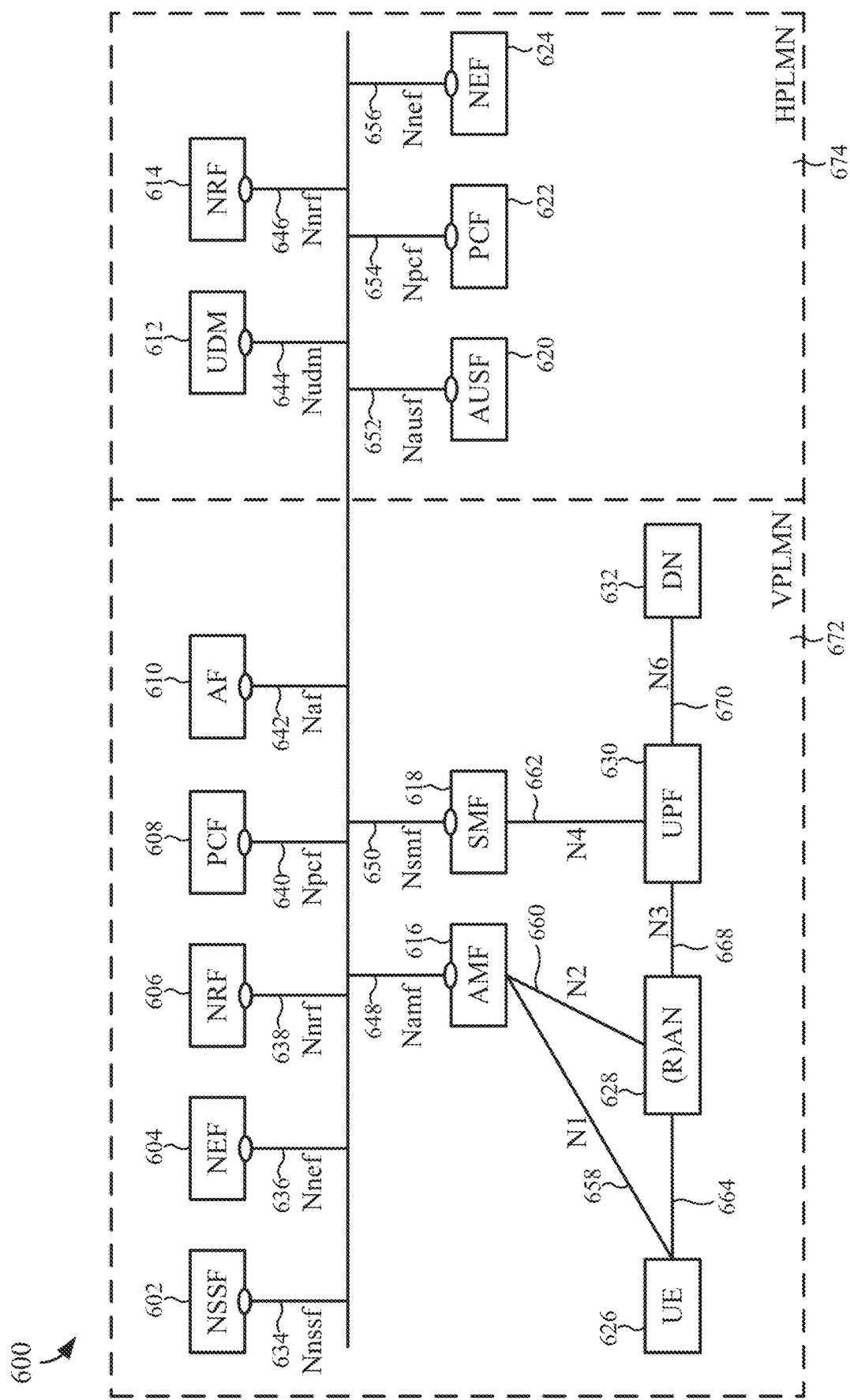
FIG. 6 illustrates an example of a potential 5G system architecture in service-based interface representation for a roaming scenario in accordance with various aspects of the disclosure.
Figure 7:
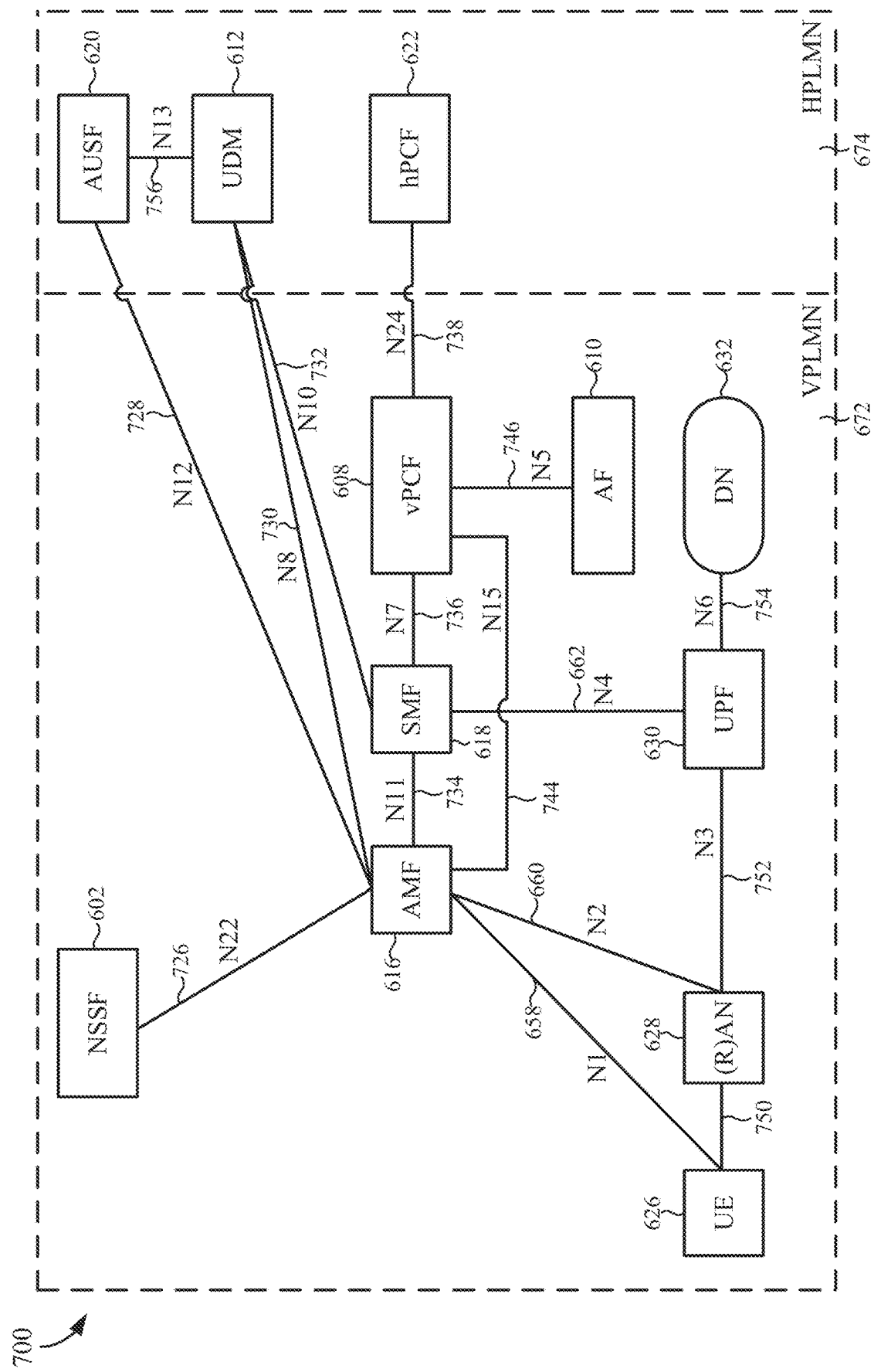
FIG. 7 illustrates an example of a potential 5G system architecture 700 in a reference point representation for a roaming scenario in accordance with various aspects of the disclosure.

FIG. 3 is a block diagram illustrating an example of a hardware implementation for a core network device 300 employing a processing system 314. In one example, the core network device 300 may be a server configured to implement a policy control function (PCF) and/or an access and mobility management function (AMF) as illustrated in FIGS. 5-7.

The core network device 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the core network device 300 may be configured to perform any one or more of the functions described herein. That is, the processor 304, as utilized in the core network device 300, may be used to implement any one or more of the processes and procedures described below and illustrated in FIG. 17.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided. Of course, such a user interface 312 is optional, and may be omitted in some examples, such as a base station.

In some aspects of the disclosure, the processor 304 may include a connection establishing circuit 340 configured for various functions, including, for example, establishing a connection with a UE. For example, the connection establishing circuit 340 may be configured to implement one or more of the functions described below in relation to FIG. 17, including, e.g., block 1702. The processor 304 may further include a message transmitting circuit 342 configured for various functions, including, for example, transmitting, to the UE, a control plane message, the control plane message including one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message. For example, the message transmitting circuit 342 may be configured to implement one or more of the functions described below in relation to FIG. 13, including, e.g., block 1704.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include connection establishing software 352 configured for various functions, including, for example, establishing a connection with a UE. For example, the connection establishing instructions 352 may be configured to implement one or more of the functions described herein in relation to FIG. 17, including, e.g., block 1702. The computer-readable storage medium 306 may further include message transmitting software 354 configured for various functions, including, for example, transmitting, to the UE, a control plane message, the control plane message including one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message. For example, the message transmitting instructions 354 may be configured to implement one or more of the functions described herein in relation to FIG. 17, including, e.g., block 1704.

Figure 4:
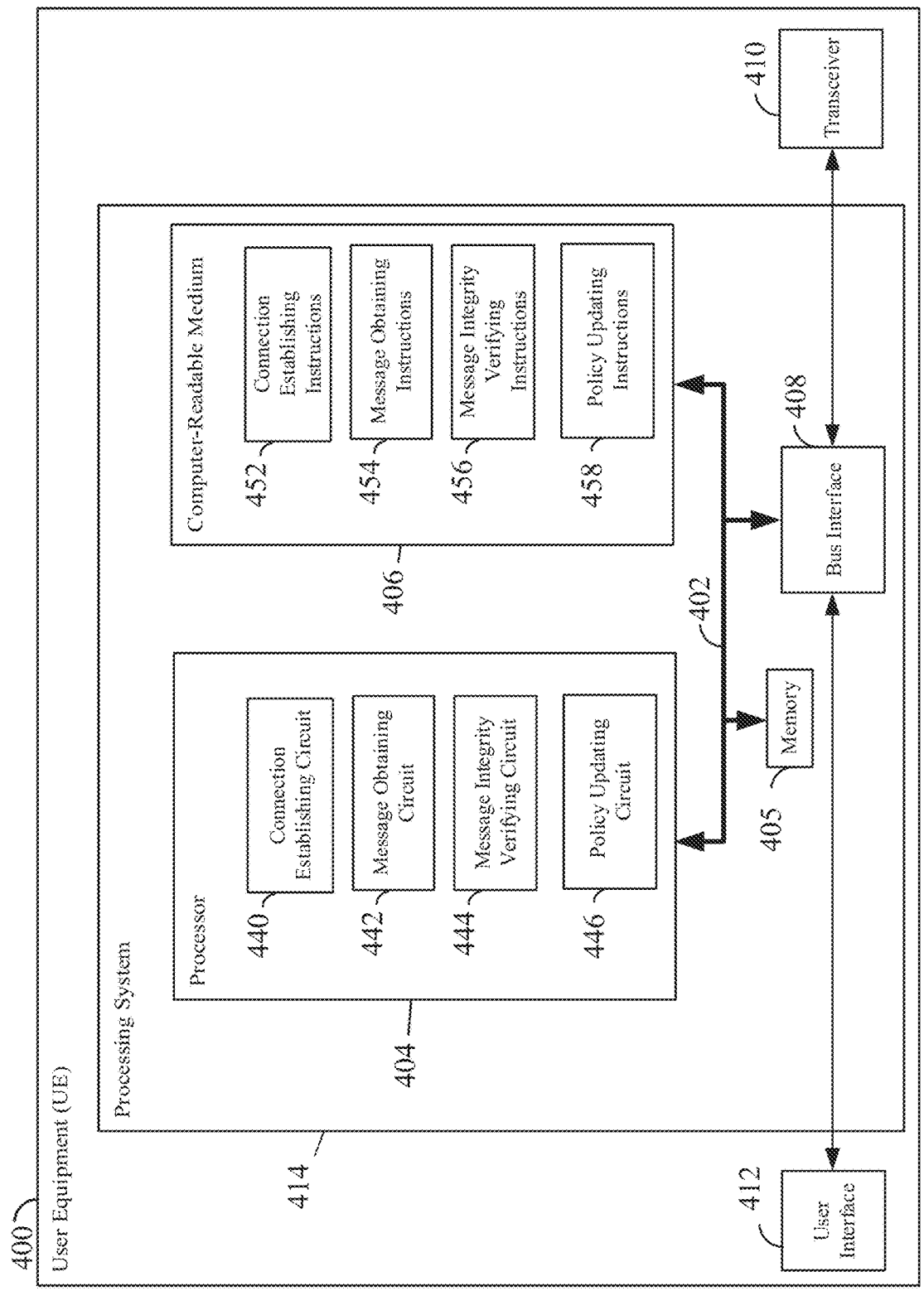
FIG. 4 is a block diagram conceptually illustrating an example of a hardware implementation for a user equipment (UE) according to some aspects of the disclosure.

FIG. 4 is a conceptual diagram illustrating an example of a hardware implementation for an exemplary UE 400 employing a processing system 414. In accordance with various aspects of the disclosure, an element, or any portion of an element, or any combination of elements may be implemented with a processing system 414 that includes one or more processors 404. For example, the UE 400 may be a UE as illustrated in any one or more of FIGS. 1, 2, 5, 6, and/or 7.

The processing system 414 may be substantially the same as the processing system 314 illustrated in FIG. 3, including a bus interface 408, a bus 402, memory 405, a processor 404, and a computer-readable medium 406. Furthermore, the UE 400 may include a user interface 412 and a transceiver 410 substantially similar to those described above in FIG. 3. That is, the processor 404, as utilized in a UE 400, may be used to implement any one or more of the processes described below and illustrated in FIGS. 14-16.

In some aspects of the disclosure, the processor 404 may include a connection establishing circuit 440 configured for various functions, including, for example, establishing a connection to a network and/or establishing a connection to a server based on a network location preconfigured at the UE 400. For example, the connection establishing circuit 440 may be configured to implement one or more of the functions described below in relation to FIGS. 14-16, including, e.g., blocks 1436, 1502 and 1602. The processor 404 may further include a message obtaining circuit 442 configured for various functions, including, for example, obtaining a control plane message from the network, where the control plane message includes one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message. For example, the message obtaining circuit 442 may also be configured to obtain a different PLMN/RAT list if an integrity verification (e.g., an integrity verification of a control plane message including one or more types of policy information) is not successful, and/or to obtain one or more types of policy information from a server (e.g. the core network device 300). For example, the message obtaining circuit 442 may be configured to implement one or more of the functions described below in relation to FIGS. 14-16, including, e.g., blocks 1404, 1424, 1436, 1504, 1508, and 1604. The processor 404 may include a message integrity verifying circuit 444 configured for various functions, including, for example, verifying an integrity of the contents of a control plane message. For example, the message integrity verifying circuit 444 may be configured to implement one or more of the functions described below in relation to FIG. 14-16, including, e.g., blocks 1406, 1408, and 1506. The processor 404 may include a policy updating circuit 446 configured for various functions, including, for example, updating at least one policy based on the one or more types of policy information. For example, the policy updating circuit 446 may be configured to implement one or more of the functions described below in relation to FIGS. 14-16, including, e.g., blocks 1414, 1416, 1426, 1428, 1510, and 1606.

In one or more examples, the computer-readable storage medium 406 may include connection establishing software 452 configured for various functions, including, for example, establishing a connection to a network and/or establishing a connection to a server based on a network location preconfigured at the UE 400. For example, the connection establishing software 452 may be configured to implement one or more of the functions described herein in relation to FIGS. 14-16, including, e.g., blocks 1436, 1502 and 1602.

In one or more examples, the computer-readable storage medium 406 may include message obtaining software 454 configured for various functions, including, for example, obtaining a control plane message from the network, where the control plane message includes one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message. For example, the message obtaining software 454 may also be configured to obtain a different PLMN/RAT list if an integrity verification (e.g., an integrity verification of a control plane message including one or more types of policy information) is not successful, and/or to obtain one or more types of policy information from a server (e.g. the core network device 300). For example, the message obtaining software 454 may be configured to implement one or more of the functions described herein in relation to FIGS. 14-16, including, e.g., blocks 1404, 1424, 1436, 1504, 1508, and 1604.

In one or more examples, the computer-readable storage medium 406 may include message integrity verifying software 456 configured for various functions, including, for example, verifying an integrity of the contents of a control plane message. For example, the message integrity verifying software 456 may be configured to implement one or more of the functions described below in relation to FIG. 14-16, including, e.g., blocks 1406, 1408, and 1506.

In one or more examples, the computer-readable storage medium 406 may include policy updating software 458 configured for various functions, including, for example, updating at least one policy based on the one or more types of policy information. For example, the policy updating software 458 may be configured to implement one or more of the functions described herein in relation to FIGS. 14-16, including, e.g., blocks 1414, 1416, 1426, 1428, 1510, and 1606.

FIG. 5 illustrates an example of a potential 5G system architecture 500 (also referred to as system architecture 500) in service-based interface representation for a non-roaming scenario in accordance with various aspects of the disclosure. As shown in FIG. 5, the system architecture 500 includes a network slice selection function (NSSF) 502, a network exposure function (NEF) 504, a network repository function (NRF) 506, a policy control function (PCF) 508, a unified data management (UDM) 510, an application function (AF) 512, an authentication server function (AUSF) 514, an access and mobility management function (AMF) 516, a session management function (SMF) 518, a UE 520, a (radio) access network ((R)AN) 522, a user plane function (UPF) 524, and a data network (DN) 526. As further shown in FIG. 5, the NSSF 502, NEF 504, NRF 506, PCF 508, UDM 510, AF 512, AUSF 514, AMF 516, and the SMF 518 may respectively implement the Nnssf interface 528, Nnef interface 530, Nnrf interface 532, Npcf interface 534, Nudm interface 536, Naf interface 538, Nausf interface 540, Namf interface 542, and Nsmf interface 544.

As shown in FIG. 5, the UE 520 is in communication with (R)AN 522 via the interface 552. In some aspects of the disclosure, the interface 552 may be a new radio (NR) interface. In the system architecture 500, N1 546 represents the reference point between the UE 520 and the AMF 516, N2 548 represents the reference point between the (R)AN 522 and the AMF 516, N3 554 represents the reference point between the (R)AN 522 and the UPF 524, N4 550 represents the reference point between the SMF 518 and the UPF 524, and N6 556 represents the reference point between the UPF 524 and the DN 526.

In various aspects of the disclosure, the PCF 608 may support one or more independent functions, such as supporting a unified policy framework to govern network behavior, providing policy rules to control plane function(s) to enforce them, and/or accessing subscription information relevant for policy decisions in a unified data repository (UDR), and/or other appropriate functions as defined in 5G standards. In various aspects of the disclosure, the AMF 616 may support one or more functions, such as non-access stratum (NAS) ciphering and integrity protection, registration management, connection management, reachability management, mobility management, providing transport for session management (SM) messages between the UE 626 and the SMF 618, transparent proxy for routing SM messages, access authentication and authorization, and/or other appropriate functions as defined in 5G standards. In various aspects of the disclosure, the SMF 618 may support one or more functions, such as session management (e.g. session establishment, modify and release, including maintaining a tunnel between the UPF 630 and the (R)AN 628, UE IP address allocation & management, configuring traffic steering at the UPF 630 to route traffic to proper destination, termination of interfaces towards policy control functions, charging data collection and support of charging interfaces, control and coordination of charging data collection at the UPF 630, and/or other appropriate functions as defined in 5G standards.

FIG. 6 illustrates an example of a potential 5G system architecture 600 (also referred to as system architecture 600) in service-based interface representation for a roaming scenario in accordance with various aspects of the disclosure. As shown in FIG. 6, the system architecture 600 includes a visited public land mobile network (VPLMN) 672 and a home public land mobile network (HPLMN) 674. As shown in FIG. 6, the VPLMN 672 includes NSSF 602, NEF 604, NRF 606, PCF 608 (also referred to as a visited PCF (vPCF) 608), AF 610, AMF 616, SMF 618, UE 626, (R)AN 628, UPF 630, and DN 632. As further shown in FIG. 6, the HPLMN 674 includes UDM 612, NRF 614, AUSF 620, PCF 622 (also referred to as a home PCF (hPCF) 622), and NEF 624. In the example configuration of FIG. 6, the NSSF 602, NEF 604, NRF 606, PCF 608, AF 610, UDM 612, NRF 614, AMF 616, SMF 618, AUSF 620, PCF 622, and NEF 624 may respectively implement the Nnssf interface 634, Nnef interface 636, Nnrf interface 638, Npcf interface 640, Naf interface 642, Nudm interface 644, Nnrf interface 646, Namf interface 648, Nsmf interface 650, Nausf interface 652, Npcf interface 654, and Nnef interface 656. In the system architecture 600, N1 658 represents the reference point between the UE 626 and the AMF 616, N2 660 represents the reference point between the (R)AN 628 and the AMF 616, N3 668 represents the reference point between the (R)AN 628 and the UPF 630, N4 662 represents the reference point between the SMF 618 and the UPF 630, and N6 670 represents the reference point between the UPF 630 and the DN 632.

The UE 626 may be in communication with the (R)AN 628 via the interface 664. In some aspects of the disclosure, the interface 664 may be a new radio (NR) interface. In the configuration of FIG. 6, it should be noted that the UE 626 is outside of the HPLMN 674 and is roaming in the VPLMN 672. In some aspects of the disclosure, the UE 626 in FIG. 6 may correspond to the UE 520 in FIG. 5.

FIG. 7 illustrates an example of a potential 5G system architecture 700 (also referred to as system architecture 700) for a roaming scenario in accordance with various aspects of the disclosure. It should be noted that the system architecture 700 in FIG. 7 is a reference point representation of the previously described system architecture 600. As shown in FIG. 7, the system architecture 700 includes the VPLMN 672 and the HPLMN 674. As further shown in FIG. 7, the VPLMN 672 includes the NSSF 602, AMF 616, SMF 618, vPCF 608, AF 610, UE 626, (R)AN 628, UPF 630, and DN 632. As further shown in FIG. 7, the HPLMN 674 includes the AUSF 620, UDM 612, and the hPCF 622. In the system architecture 700, N3 752 represents the reference point between the (R)AN 628 and the UPF 630, N5 746 represents the reference point between the vPCF 608 and the AF 610, N6 754 represents the reference point between the UPF 630 and the DN 632, N7 736 represents the reference point between the SMF 618 and the vPCF 608, N8 730 represents the reference point between the AMF 616 and the UDM 612, N10 732 represents the reference point between the SMF 618 and the UDM 612, N11 734 represents the reference point between the AMF 616 and the SMF 618, N12 728 represents the reference point between the AMF 616 and the AUSF 620, N13 756 represents the reference point between the AUSF 620 and the UDM 612, N15 744 represents the reference point between the AMF 616 and the vPCF 608, N22 726 represents the reference point between the NSSF 602 and the AMF 616, and N24 738 represents the reference point between the vPCF 608 and the hPCF 622. In the aspects described herein, it should be noted that the term "reference point" may be used interchangeably with the term "interface."

Some aspects of the disclosure are directed to solutions that enable delivery of policy information (e.g., information regarding preferred networks and radio access technologies (RATs), UE route selection policy (URSP) information, and/or an access network discovery and selection policy (ANDSP) information) from a PCF to a UE. Accordingly, some of the described solutions enable an HPLMN (e.g., HPLMN 674) to provide one or more of its roaming UEs (e.g., UE 626 in VPLMN 672) policy information (e.g., policy information provided by the hPCF 622) depending on the current location of the one or more roaming UEs. In some aspects of the disclosure, such solutions may be implemented with respect to the control plane. For example, the HPLMN 674 may communicate information regarding preferred networks and RATs to the UE 626 via the VPLMN 672 using control plane signaling. In some aspects of the disclosure, the VPLMN 672 may not be able to alter the policy information provided by the HPLMN 674.

Distribution of Policy Decisions

FIG. 8 illustrates an exemplary table 800 listing several types of policy information that may be delivered to a UE (e.g., UE 520, 626) in accordance with various aspects of the disclosure. As shown in FIG. 8, such types of policy information may include quality of service (QoS) information 802, packet inspection information 804, packet routing and forwarding information 806, traffic usage reporting information 808, traffic steering control information 810, congestion management information 812, mobility and service area restriction information 814, RAT and/or frequency selection priority information 816, ANDSP information 818, and/or URSP information 820. The UE may use the ANDSP information 818 for selecting non-3GPP accesses (e.g., a wireless local area network, such as a Wi-Fi network) and for deciding how to route traffic between the selected 3GPP access and non-3GPP access. In some aspects of the disclosure, an hPCF (e.g., hPCF 622) or a vPCF (e.g., vPCF 608) may provide the ANDSP information 818 to the UE via an AMF (e.g., AMF 616) when the UE is roaming. The UE (e.g., 520, 626) may use the URSP information 820 to determine how to route outgoing traffic (e.g., to an existing PDU session, to a new PDU session, or offload to non-3GPP access). The table 800 further shows the distribution of the enforcement of policy decisions, indicating the enforcement control part functions 822 per type of policy, their actual enforcement functions 824, and the associated reference points/interfaces 826.

In some aspects of the disclosure, there may be a number of categories of policy information to be delivered to a UE. For example, a first category of policy information may include policy information (also referred to as PCF rules) that may be processed by an AMF (e.g., AMF 516, 616) and/or an SMF (e.g., SMF 518, 618) before delivery to the UE (e.g., UE 520, 626). Such policy information may include the QoS information 802 and/or the service area restriction information 814. For example, a second category of policy information may include policy information that may be delivered transparently to the UE. Such policy information may include ANDSP information 818 and/or URSP information 820. In some aspects of the disclosure, the first category of policy information may be handled as part of the mobility management (MM) and session management (SM) signaling over NAS. With respect to the second category of information, in some aspects of the disclosure, the AMF may be configured to transparently deliver the URSP information 820 to the UE over the N1 interface (e.g., N1 interface 546, 658). In some aspects of the disclosure, the AMF may also be configured to transparently provide ANDSP information 818 to the UE over the N1 interface. In some aspects, the network architectures described herein (e.g., network architectures 500, 600, 700) may implement a generic policy transport mechanism over the N1 interface to enable transparent delivery of the ANDSP information 818 from the AMF to the UE over the N1 interface. In some aspects, a Namf interface (e.g., Namf interface 542, 648) may provide a mechanism for a PCF (e.g., PCF 508, 608) to invoke the delivery of policy information (e.g., ANDSP information 818 and/or URSP information 820) over the N1 interface (e.g., N1 interface 546, 658).

In some scenarios, delivery of policy information to the UE (e.g., UE 520, 626) via the N1 interface (e.g., N1 interface 546, 658) may be unsuitable or inefficient in cases where the policy information (e.g., ANDSP information 818) is too large. In such cases, if the size of the policy information exceeds a size limit for the NAS (e.g., a maximum size of one NAS protocol data unit (PDU)), a hybrid delivery approach may be used to deliver the policy information to the UE. Accordingly, in some aspects of the disclosure, a NAS control plane message (also referred to as a control plane message) to the UE may trigger the UE to retrieve the policy information through a user plane connection. The control plane message may include a Uniform Resource Locator (URL) that the UE may access to retrieve the policy information.

Interactions Between a Policy Control Function (PCF) and an Access and Mobility Management Function (AMF)

In various aspects of the disclosure, the PCF (e.g., PCF 508, 608) may be configured to provide access and mobility management related policies to the AMF (e.g., AMF 516, 616). For example, the PCF may transmit the access and mobility management related policies via the Npcf interface (e.g., Npcf interface 534, 640), which may be received at the AMF via the Namf (e.g., Namf interface 542, 648). In some aspects of the disclosure, the Npcf and Namf interfaces may be configured to support various features, such as handling of a UE context establishment request sent by the AMF to the PCF as part of the registration procedure(s) of the UE, provisioning of an access and mobility management decision from the PCF to the AMF, delivery of network events from the AMF to the PCF, handling of UE context termination request sent by the AMF to the PCF as part of a UE de-registration procedure, and handling of transparent delivery of policy information for the UE or a policy download trigger from the PCF to the UE via the AMF.

Interactions Between a Policy Control Function (PCF) and a User Equipment (UE)

In some aspects of the disclosure, the Npcf interface (e.g., Npcf interface 534, 640) and the Namf interface (e.g., Namf interface 542, 648) may be configured to enable delivery of policy information to the UE (e.g., UE 520, 626). In one example approach, the PCF (e.g., PCF 508, 608) may provide policy information via the Npcf interface to the AMF (e.g., AMF 516, 616). The AMF may receive the policy information via the Namf interface and may deliver the policy information to the UE over the N1 interface. As described above, the N1 interface (e.g., N1 interface 546, 658) represents the reference point between the UE and the AMF and represents interactions that are transparently transmitted over the (R)AN. With reference to the non-roaming scenario shown in FIG. 5, for example, the PCF 508 may provide the URSP information 820 to the AMF 516 (e.g., via the Npcf interface 534 and the Namf interface 542). The AMF 516 may then provide the URSP information 820 to the UE 520 via the N1 interface 546. In some aspects of the disclosure, the AMF 516 may not change the URSP information 820 provided by PCF 508. In another example, with reference to the roaming scenario shown in FIG. 7, the vPCF 608 may provide the URSP information 820 to the AMF 616 (e.g., via the N15 interface 744). The AMF 616 may then provide the URSP information 820 to the UE 626 via the N1 interface 658. In this example, the URSP information 820 provided to the UE 626 may contain information provided by the hPCF 622 and information provided by the vPCF 608.

In another example approach, the Npcf and Namf may be configured to enable delivery of a policy download trigger from the PCF to the UE via the AMF. This approach may be used if the policy information to be delivered to the UE exceeds a threshold. For example, if the PCF (e.g., PCF 508, 608) determines that the size of the policy information to be delivered to the UE (e.g., UE 520, 626) exceeds the threshold (e.g. where the threshold is set to the maximum size of a NAS PDU), the PCF may transmit a policy download trigger that is intended for the UE via the Npcf interface (e.g., Npcf interface 534, 640) to the AMF (e.g., AMF 516, 616). The AMF may receive the policy download trigger via the Namf interface (e.g., Namf interface 542, 648) and may deliver the policy download trigger to the UE over the N1 interface (e.g., N1 interface 546, 658). The UE, in response to the policy download trigger, may download policy information at a URL. In some aspects, and as described in greater detail herein, the policy download trigger may be configured as a PCF payload that includes the URL.

Example Options for Delivering Policy Information to the UE

In a first example option for delivering policy information to the UE, with reference to the roaming scenario shown in FIG. 6, the vPCF 608 in the VPLMN 672 may deliver policy information to the UE 626 using a generic UE configuration update procedure. This option, however, may not be suitable for certain types of policy information because contents of a configuration update command may be set by the AMF 616 in the VPLMN 672. This may allow the VPLMN 672 to modify the policy information. In some cases, this option may be suitable for communication of data managed by the AMF 616.

In a second example option for delivering policy information to the UE, with reference to the non-roaming scenario in FIG. 5, the PCF 508 may deliver policy information to the UE 520 by transmitting a policy download trigger to the UE 520. The policy download trigger may be a non-access stratum (NAS) control plane message that causes the UE 520 to set up an IP connection (e.g., a secure IP connection) to a server and to obtain the policy information over the user plane. This option may be used in cases where the size of the policy information is expected to be more than the payload of one NAS control plane payload. In some aspects, the PCF 508 may implement this option by generating a dedicated NAS control plane message (e.g., a "Policy Download Trigger message"). In other aspects, the PCF 508 may implement this option by using a generic NAS transport message with a new payload type field (e.g., a "Policy Download Trigger" payload type field). In a roaming scenario, with reference to FIG. 6, the vPCF 608 in the VPLMN 672 may deliver policy information to the UE 626 by transmitting a policy download trigger to the UE 626 in cases where the size of the policy information is expected to be more than the payload of one NAS control plane payload. As previously described, the policy download trigger may be a NAS control plane message that causes the UE 626 to set up an IP connection (e.g., a secure IP connection) to a server and to obtain the policy information from the server over the user plane. In some aspects, the VPLMN 672 may implement this option by generating a dedicated NAS control plane message (e.g., a "Policy Download Trigger message"). In other aspects, the VPLMN 672 may implement this option by using a generic NAS transport message with a new payload type field (e.g., a "Policy Download Trigger" payload type field).

In a third example option for delivering policy information to the UE, with reference to the non-roaming scenario in FIG. 5, the PCF 508 may deliver policy information to the UE 520 in a NAS control plane message. In some aspects, the PCF 508 may implement this option by generating a dedicated NAS control plane message (e.g. a "Policy Update" message). In other aspects, the PCF 508 may implement this option by using a generic NAS transport message with a new payload type field (e.g., a "Policy Update" payload type field). In a roaming scenario, with reference to FIG. 6, the vPCF 608 in the VPLMN 672 may deliver policy information to the UE 626 in a NAS control plane message. In some aspects, the vPCF 608 in the VPLMN 672 may implement this option by creating a dedicated NAS control plane message (e.g. a "Policy Update" message). In other aspects, the vPCF 608 in the VPLMN 672 may implement this option by using a generic NAS transport message with a new payload type field (e.g., a "Policy Update" payload type field).

In a fourth example option for delivering policy information to the UE, with reference to the non-roaming scenario in FIG. 5, the PCF 508 may deliver QoS policy information 802 to the UE 520 by providing policy information to the SMF 518 via the Npcf interface 534. The SMF 518 may receive the policy information via the Nsmf interface 544. The SMF 518 may prepare the QoS rules based on the received policy information and may deliver the QoS rules to the UE 520 in a PDU session establishment message.

In a fifth example option for delivering policy information to the UE, with reference to the non-roaming scenario in FIG. 5, the PCF 508 may deliver mobility restrictions (MOD) and/or service area restrictions 814 to the AMF 516 via the Npcf interface 534. The AMF 516 may receive the mobility restrictions (MOD) and/or service area restrictions via the Namf interface 542. In some aspects of the disclosure, the AMF 516 may determine the mobility restriction parameters based on the policy information received from the PCF 508 over an interface (e.g., an interface N15 that may be configured between the AMF 516 and the PCF 508) and may deliver the mobility restriction parameters to the UE 520 in a configuration update message or a registration accept message.

In conventional network architectures, a unified, extensible solution for communicating all types of policy information (e.g. preferred public land mobile network (PLMN)/radio access technologies (RATs) list, ANDSP, URSP) to a UE may not be available because the size of one or more policies may exceed the maximum length (e.g., 65,535 octets) of a single NAS transport message payload. For example, the size of a preferred PLMN/RAT list may be within the maximum length of a single NAS transport message payload, but the sizes of the ANDSP information 818 and the URSP information 820 may exceed the maximum length of a single NAS transport message payload. As such, in some scenarios, all types of policy information (e.g. preferred PLMN/RATs list, ANDSP, URSP) may not be included in a single NAS transport message payload. These limitations may be overcome by implementing the sixth example option for delivering policy information to the UE described herein.

In a sixth example option for delivering policy information to the UE, if the size of the policy information to be delivered to the UE is less than or equal to the maximum length of the payload container information element (IE) (e.g., policy information ≤65,535 octets) of a generic NAS transport message, a generic NAS transport message may be used with the payload container IE set to the actual policy information. For example, the PCF 508 may transmit a transparent PCF payload that includes the policy information to the AMF 516 via the Npcf interface 534. The AMF 516 may receive the PCF payload via the Namf interface 542. The AMF 516 may then encapsulate the PCF payload in a NAS transport message and may deliver the NAS transport message to the UE 520 via the N1 interface 546. However, if the size of the policy information is greater than the maximum length of the payload container IE (e.g., policy information >65,535 octets) of a generic NAS transport message, the PCF 508 may transmit a transparent PCF payload to the AMF 516 via the Npcf interface 534. The PCF payload may include an indication of the policy to be updated, an indication that the PCF payload includes a URL, and the URL that may be accessed by the UE 520 to retrieve the policy information. The AMF 516 may receive the PCF payload via the Namf interface 542. The AMF 516 may then encapsulate the PCF payload in a NAS transport message and may deliver the NAS transport message to the UE 520 via the N1 interface 546. The UE 520 may access the URL in the encapsulated PCF payload to obtain the policy information over the user plane.

In a roaming scenario, with reference to FIG. 6, if the size of the policy information is less than or equal to the maximum length of the payload container information element (IE) (e.g., policy information ≤65,535 octets) of a generic NAS transport message, a generic NAS transport message may be used with the payload container IE set to the actual policy information. For example, the vPCF 608 may transmit a transparent PCF payload that includes the policy information to the AMF 616 via the Npcf interface 640. The AMF 616 may receive the PCF payload via the Namf interface 648. The AMF 616 may then encapsulate the PCF payload in a NAS transport message and may deliver the NAS transport message to the UE 626 via the N1 interface 658. However, if the size of the policy information is greater than the maximum length of the payload container IE (e.g., policy information >65,535 octets) of a generic NAS transport message, the PCF 608 may transmit a transparent PCF payload to the AMF 616 via the Npcf interface 640. The PCF payload may include an indication of the policy to be updated, an indication that the PCF payload includes a URL, and the URL that may be accessed by the UE 520 to retrieve the policy information. The AMF 616 may receive the PCF payload via the Namf interface 648. The AMF 616 may then encapsulate the PCF payload in a NAS transport message and may deliver the NAS transport message to the UE 626 via the N1 interface 658. In some aspects, the transparent payload from the vPCF 608 may include policy information provided by the hPCF 622 in the HPLMN 674. In various aspects of the disclosure, and as described in detail herein, the payload information IE may indicate a type of policy that is being conveyed and/or whether the payload container IE contains the actual policy data or a URL.

As described in detail herein, the disclosed aspects may enable the network to "push" a policy information update to the UE (e.g., 520, 626). In other aspects of the disclosure, a UE (e.g., 520, 626) may "pull" (e.g., request) updated policy information from the network. For example, to enable the UE (e.g., 520, 626) to pull updated policy information, the UE may be pre-configured with a URL and may connect to the URL anytime to download a policy information update over the user plane. In some aspects of the disclosure, the UE (e.g., 520, 626) may be configured by the home operator with the IP address of the PCF (e.g., PCF 508, 608, 622) and may access the IP address to download the policy information. In other aspects of the disclosure, the UE (e.g., 520, 626) may discover the IP address of the PCF (e.g., PCF 508, 608, 622) when in the HPLMN (e.g., HPLMN 674) or when roaming in a VPLMN (e.g., VPLMN 672) using a standardized URL or a fully qualified domain name (FQDN). In some aspects of the disclosure, the serving PLMN (e.g., the VPLMN 672) may also provide the URL or FQDN used to discover the PCF (e.g., vPCF 608) upon successful registration.

FIG. 9 illustrates an example of the contents in a downlink (DL) NAS transport message for delivering policy information, such as a preferred PLMN/RAT list update, to a UE (e.g., UE 520, 626) in accordance with various aspects of the disclosure. As shown in FIG. 9, the DL NAS transport message contents 900 may include a number of information elements (IEs) 914, such as an extended protocol discriminator 902, a security header type 904, a spare half octet 906, a DL NAS transport message identity 908, a payload container 910, and payload information 912. The attributes listed under the type field 916 generally indicate the type of the corresponding information element. In the example configuration of FIG. 9, the attribute value "M" under the presence field 918 indicates that the corresponding information element is mandatory in the DL NAS transport message. In the example configuration of FIG. 9, the attribute value "V" under the format field 920 means value only, whereas the attribute values "TLV" and "TLV-E" under the format field 920 mean type, length, and value. In the example configuration of FIG. 9, each attribute value under the length field 922 indicates the length of the corresponding information element in terms of octets. For example, the attribute value "1" indicated under the length field 922 for the DL NAS transport message identity 908 means that the length of the DL NAS transport message identity 908 may be one octet. As another example, the attribute value "4-65,538" indicated under the length field 922 for the payload container 910 means that the length of the payload container 910 may be between 4 to 65,538 octets.

Figure 10:
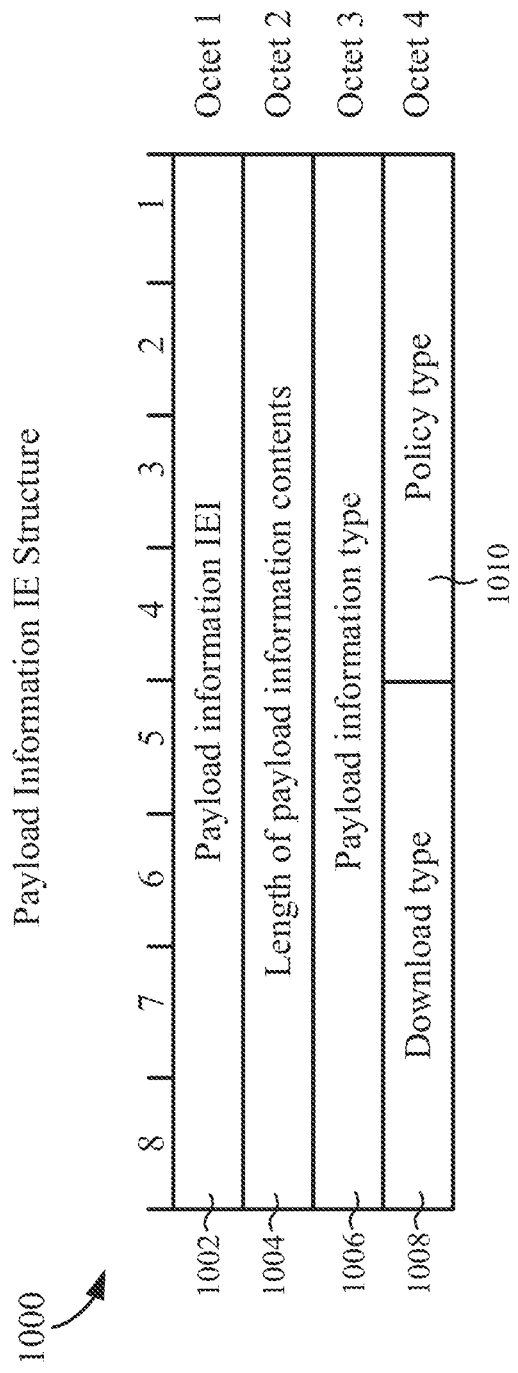
FIG. 10 illustrates an example payload information IE structure that may be used to update one or more policies at the UE.

FIG. 10 shows an example payload information IE structure 1000 that may be used to update one or more policies at the UE (e.g., UE 520, 626). In the example shown in FIG. 10, the payload information IE structure 1000 may include the payload information IE indicator (IEI) 1002 (e.g., octet 1 in FIG. 10), the length of payload information contents 1004 (e.g., octet 2 in FIG. 10), the payload information type (e.g., octet 3 in FIG. 10) 1006, the download type 1008 (e.g., octet 4, bit 5 to bit 8 in FIG. 10), and the policy type 1010 (e.g., octet 4, bit 1 to bit 4 in FIG. 10).

Figure 11:
FIG. 11 illustrates an example coding of payload information type bits for a payload information IE structure.

FIG. 11 shows an example coding 1100 of payload information type bits for the payload information IE structure 1000. It should be understood that the example illustrated in FIG. 11 represents one possible format that may be used for a NAS transport message, and within the scope of the present disclosure, many other suitable message formats may be utilized. As shown in FIG. 11, different payload information types may be indicated using different codes (e.g., different 8-bit binary codes). For example, as shown in FIG. 11, the 8-bit binary code "00000011" may be used to indicate a Short Message Service (SMS) payload information type 1102 and the 8-bit binary code "00000101" may be used to indicate a policy update payload information type 1104. For example, with reference to FIGS. 10 and 11, the network may set the payload information type 1006 in FIG. 10 to indicate that the payload information type is a policy update payload information type 1104 by setting the eight bits in octet 3 in FIG. 10 to "00000101."

Figure 12:
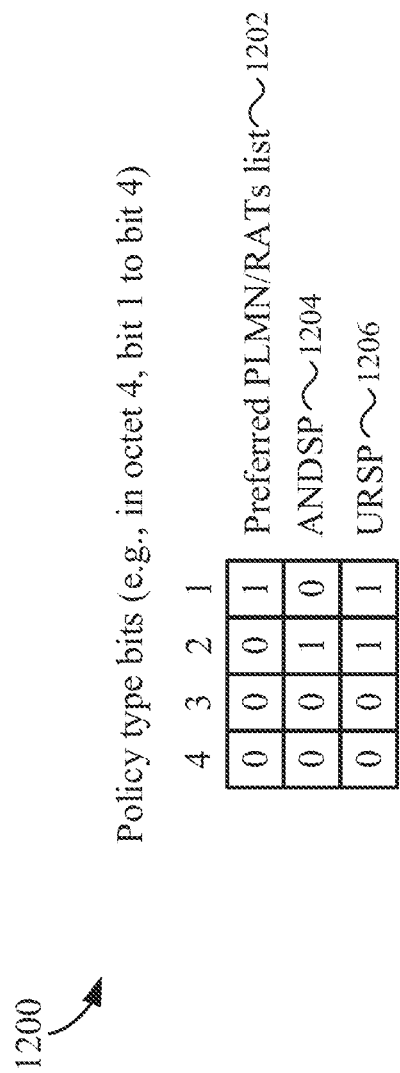
FIG. 12 illustrates an example coding of policy type bits for a payload information IE structure.

FIG. 12 shows an example coding 1200 of policy type bits for the payload information IE structure 1000. It should be understood that the example illustrated in FIG. 12 represents one possible format that may be used for a NAS transport message, and within the scope of the present disclosure, many other suitable message formats may be utilized. As shown in FIG. 12, different policy types may be indicated using different codes (e.g., different 4-bit binary codes). For example, as shown in FIG. 12, the 4-bit binary code "0001" may be used to indicate a preferred PLMN/RATs list policy type 1202, the 4-bit binary code "0010" may be used to indicate an ANDSP policy type 1204, and the 4-bit binary code "0011" may be used to indicate a URSP policy type 1206. For example, with reference to FIGS. 10 and 12, the network may set the policy type 1010 in FIG. 10 to indicate that the policy type is the ANDSP policy type 1204 by setting the four bits in octet 4 (e.g., bit 1 to bit 4) in FIG. 10 to "0010."

Figure 13:
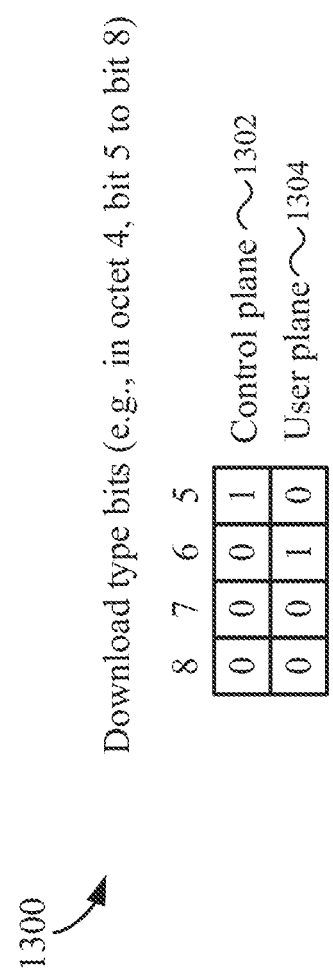
FIG. 13 illustrates an example coding of download type bits for a payload information IE structure.
Figure 14A:
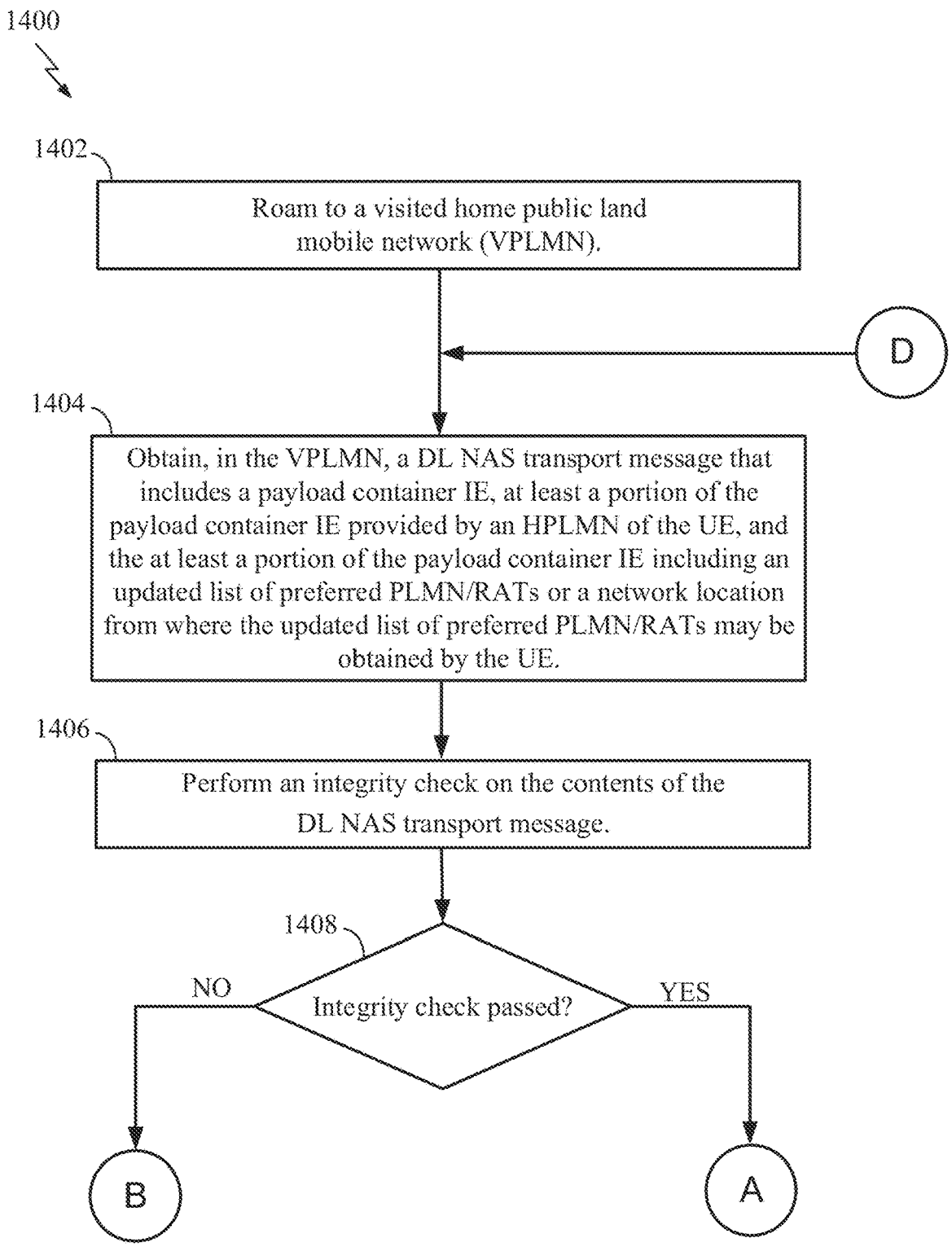
FIG. 14 (including FIGS. 14A to 14D) is a flow chart illustrating an exemplary process for steering a UE in a visited public land mobile network (VPLMN) according to some aspects of the disclosure.
Figure 14B:
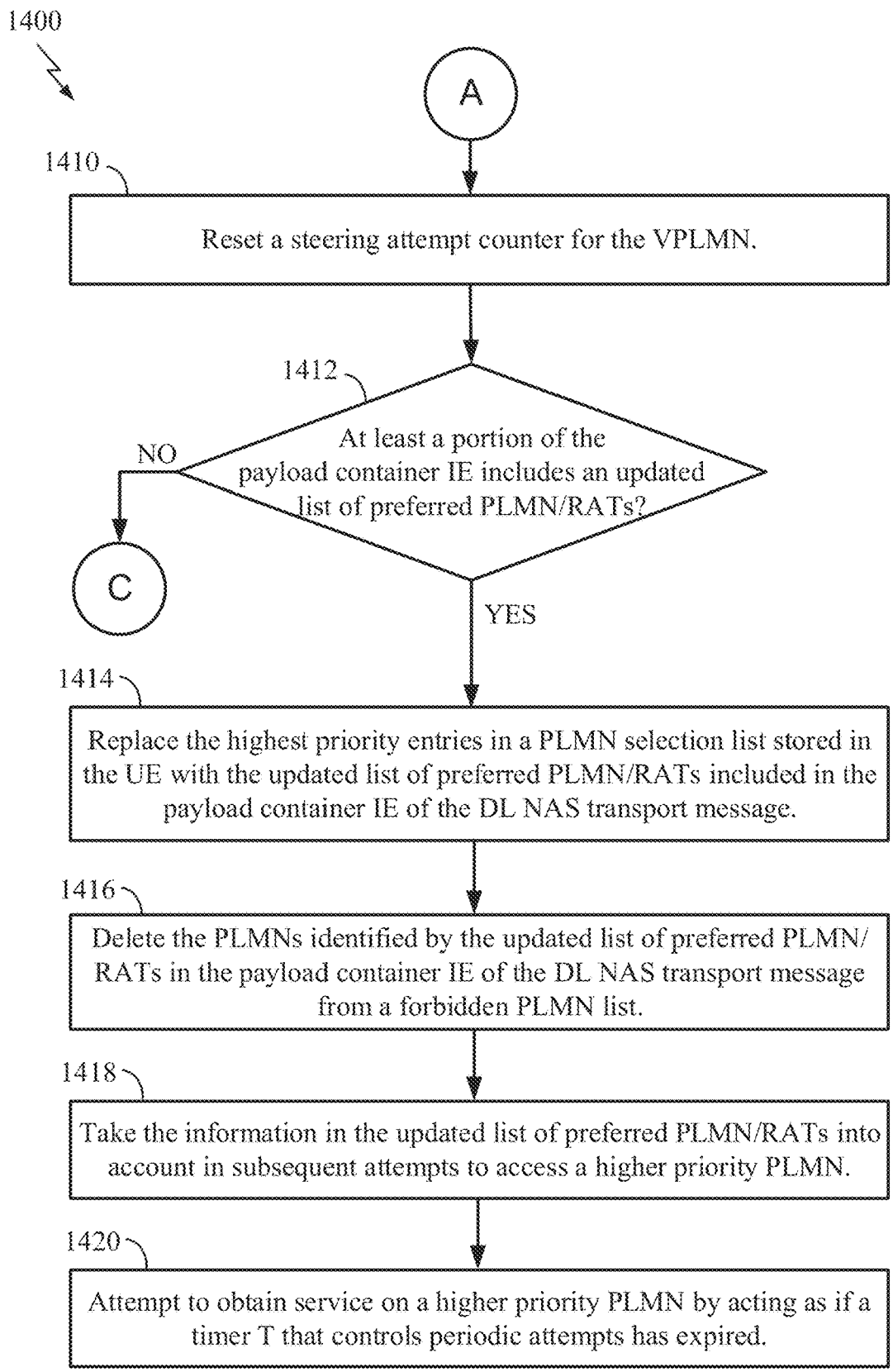
Figure 14C:
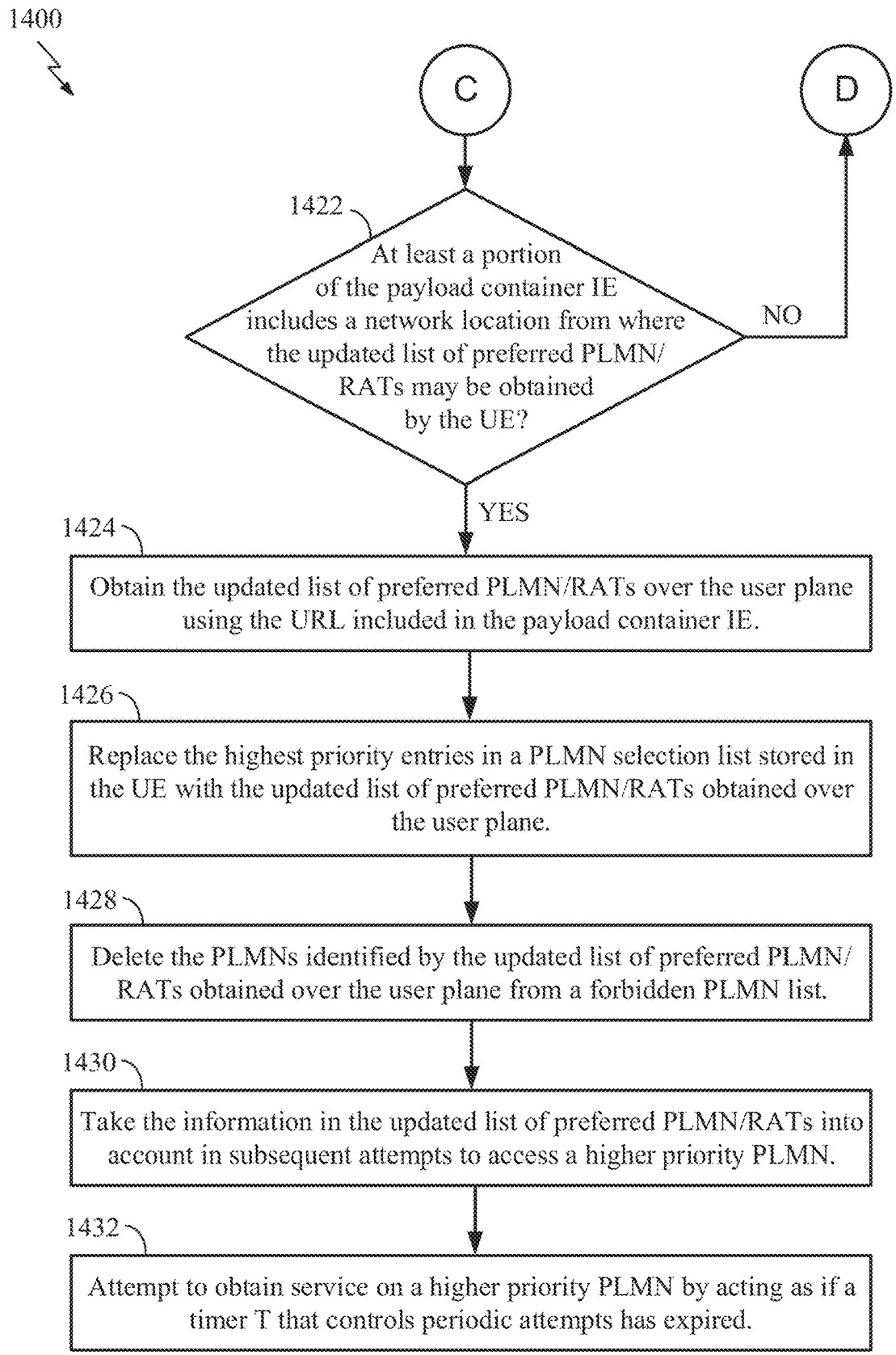
Figure 14D:
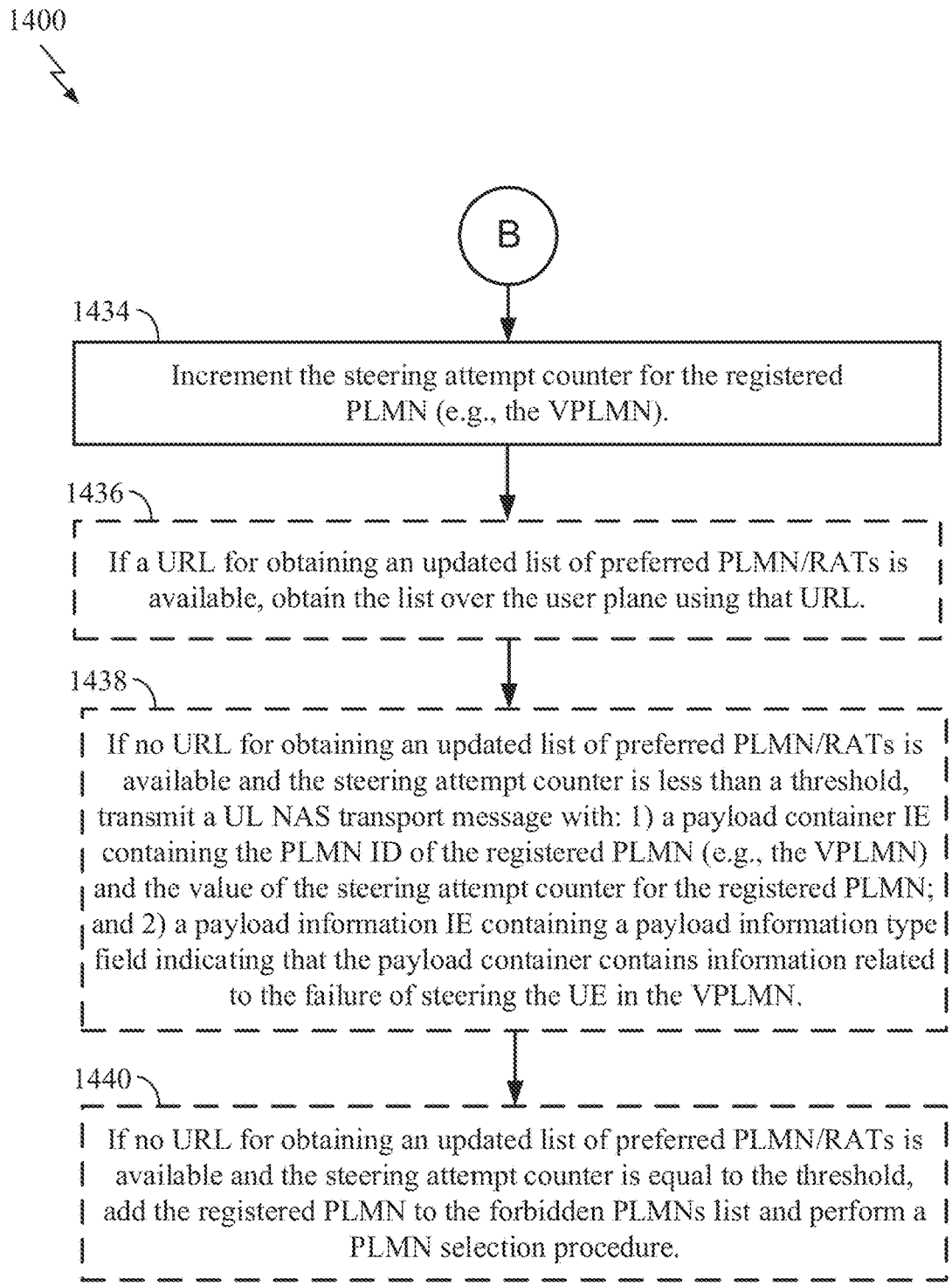

FIG. 13 shows an example coding 1300 of download type bits for the payload information IE structure 1000. It should be understood that the example illustrated in FIG. 13 represents one possible format that may be used for a NAS transport message, and within the scope of the present disclosure, many other suitable message formats may be utilized. As shown in FIG. 13, different download types may be indicated using different codes (e.g., different 4-bit binary codes). For example, as shown in FIG. 13, the 4-bit binary code "0001" may be used to indicate a control plane download type 1302 and the 4-bit binary code "0010" may be used to indicate a user plane download type 1304. For example, with reference to FIGS. 10 and 13, the network may set the download type 1008 in FIG. 10 to indicate that the download type is the user plane download type 1304 by setting the four bits in octet 4 (e.g., bit 5 to bit 8) in FIG. 10 to "0010."

Procedures for Steering the UE in the VPLMN

FIG. 14 (including FIGS. 14A to 14D) is a flow chart illustrating an exemplary process for steering the UE 626 in the VPLMN 672 according to some aspects of the disclosure. The purpose of the procedure for steering the UE 626 in the VPLMN 672 is to allow the HPLMN 674 to update the list of preferred public land mobile network (PLMN)/radio access technologies (RATs) at the UE 626 (e.g., depending on the current location of the UE 626) using NAS signaling. It should be understood that blocks with dashed lines in FIG. 14 represent optional blocks.

In the aspects described with reference to FIG. 14, the VPLMN 672 may not be able to modify policy information provided by the HPLMN 674. The UE 626 may be configured to maintain a separate steering attempt counter for each PLMN. The UE 626 may increment the steering attempt counter for a given PLMN if an integrity check of the contents of the payload container IE of a DL NAS transport message fails at the UE 626, where the DL NAS transport message includes a payload information IE containing a payload information type field indicating that the payload container contains an updated list of preferred PLMN/RATs. The UE 626 may reset the steering attempt counter if any one of the following conditions is met: 1) the UE 626 is switched off; 2) the Universal Subscriber Identity Module (USIM) of the UE 626 is removed; and 3) the integrity check of the contents of the payload container IE of a DL NAS transport message with a payload information IE containing a payload information type field indicating that the payload container contains an updated list of preferred PLMN/RATs passes at the UE 626.

At block 1402, the UE 626 may roam to a VPLMN 672 (e.g., the UE 626 may leave an area covered by the HPLMN 674 and may enter an area covered by the VPLMN 672). At block 1404, the UE 626 may obtain, in the VPLMN 672, a DL NAS transport message that includes a payload container information element (IE). At least a portion of the payload container IE may be provided by the HPLMN 674 of the UE 626, and the at least a portion of the payload container IE may include an updated preferred PLMN/RATs list or a network location from where the updated PLMN/RATs list may be obtained by the UE.

In one aspect of the disclosure, if the length of the updated preferred PLMN/RATs list to be provided to the UE 626 is less than or equal to the maximum length of a single NAS transport message payload (e.g., less than or equal to 65,535 octets), the VPLMN 672 may transmit a DL NAS transport message to the UE 626 where: 1) the payload container IE of the DL NAS transport message is set to include the updated list of preferred PLMN/RATs; and 2) the payload information IE of the DL NAS transport message is set to include a payload information type field indicating that the payload container contains an updated list of preferred PLMN/RATs, and is further set to include a MAC field enabling the UE 626 to verify the integrity of the contents of the payload container. In some aspects of the disclosure, the updated list of preferred PLMN/RATs may be encoded (e.g., compressed and/or encrypted). In such aspects, the previously described length of the updated list of preferred PLMN/RATs may refer to the encoded length of the updated list of preferred PLMN/RATs.

In another aspect of the disclosure, if the length of the updated list of preferred PLMN/RATs is greater than the maximum length of a single NAS transport message payload (e.g., greater than 65,535 octets), the VPLMN 672 may transmit a DL NAS transport message to the UE 626 where: 1) the payload container IE of the DL NAS transport message is set to include a URL that the UE 626 may use to retrieve the updated list of preferred PLMN/RATs over the user plane; and 2) the payload information IE of the DL NAS transport message is set to include a payload information type field indicating that the payload container contains a URL to retrieve an updated list of preferred PLMN/RATs over the user plane, and is further set to include a MAC field enabling the UE 626 to verify the integrity of the contents of the payload container.

At block 1406, after the UE has obtained the DL NAS transport message, the UE 1406 may perform an integrity check on the contents of the DL NAS transport message. For example, the UE 626 may attempt to verify the integrity of the contents in the payload container IE using the MAC field in the payload information IE. If the integrity check of the contents in the payload container IE is successful (e.g., the integrity check passes), then at block 1410, the UE 626 may reset the steering attempt counter for the registered PLMN (e.g., the VPLMN 672). If the integrity check of the contents in the payload container IE is successful (e.g., at block 1406) and if the payload information type field of the DL NAS transport message indicates that the payload container IE contains an updated list of preferred PLMN/RATs (e.g., at block 1412), then at block 1414, the UE 626 may replace the highest priority entries in a PLMN selection list (e.g., an Operator Controlled PLMN Selector with Access Technology list) stored in the UE 626 with the updated list of preferred PLMN/RATs included in the payload container IE of the DL NAS transport message. At block 1416, the UE 626 may delete the PLMNs identified by the list in the payload container IE of the DL NAS transport message from a forbidden PLMN list, if the PLMNs identified by the list in the payload container IE are present in forbidden PLMN list. In some aspects, the UE 626 may further delete any information associated with the deleted PLMNs that may be stored in the USIM and/or the internal memory of the UE 626. At block 1418, the UE 626 may take the information in the updated list of preferred PLMN/RATs into account in subsequent attempts to access a higher priority PLMN. At block 1420, the UE 626 may attempt to obtain service on a higher priority PLMN by acting as if a timer T that controls periodic attempts has expired.

With reference to block 1408, if the integrity check of the contents in the payload container IE is successful and if the payload information type field of the DL NAS transport message indicates that at least a portion of the payload container IE contains a network location (e.g., a URL) from where the updated list of preferred PLMN/RATs may be obtained by the UE over the user plane (e.g., at block 1422), then at block 1424, the UE 626 may obtain the updated list of preferred PLMN/RATs over the user plane using the URL included in the payload container IE. At block 1426, the UE 626 may replace the highest priority entries in a PLMN selection list (e.g., an Operator Controlled PLMN Selector with Access Technology list) stored in the UE 626 with the list of preferred PLMN/RATs obtained over the user plane. At block 1428, the UE 626 may delete the PLMNs identified by the obtained list of preferred PLMN/RATs from a forbidden PLMN list, if the PLMNs identified by the obtained list of preferred PLMN/RATs are present in forbidden PLMN list. In some aspects, the UE 626 may further delete any information associated with the deleted PLMNs that may be stored in the USIM and/or the internal memory of the UE 626. At block 1430, the UE 626 may take the information in the updated list of preferred PLMN/RATs into account in subsequent attempts to access a higher priority PLMN. At block 1432, the UE 626 may attempt to obtain service on a higher priority PLMN by acting as if a timer T that controls periodic attempts has expired. If at least a portion of the payload container IE of the DL NAS transport message does not contain a network location (e.g., a URL) from where the updated list of preferred PLMN/RATs may be obtained by the UE over the user plane (e.g., at block 1422), then the process returns to block 1404.

With reference to block 1408, if the integrity check of the contents of the payload container IE fails at the UE 626, then at block 1434, the UE 626 may increment the steering attempt counter for the registered PLMN (e.g., the VPLMN 672). At block 1436, if a network location (e.g., a URL) for obtaining an updated list of preferred PLMN/RATs is available at the UE 626 (e.g., if the UE 626 is pre-configured with a URL), the UE 626 may obtain the list over the user plane using that URL. At block 1438, if no URL for obtaining an updated list of preferred PLMN/RATs is available to the UE 626 (e.g., if the UE 626 is not pre-configured with a URL) and the steering attempt counter is less than a threshold (e.g., a threshold set to five attempts), the UE 626 may transmit a UL NAS transport message with: 1) a payload container IE containing the PLMN ID of the registered PLMN and the value of the steering attempt counter for the registered PLMN; and 2) a payload information IE containing a payload information type field indicating that the payload container contains information related to the failure of steering the UE 626 in the VPLMN 672. At block 1440, if no URL for obtaining an updated list of preferred PLMN/RATs is available to the UE 626 (e.g., if the UE 626 is not pre-configured with a URL) and the steering attempt counter is equal to the threshold (e.g., a threshold set to five attempts), the UE 626 may add the registered PLMN (e.g., the VPLMN 672) to the forbidden PLMNs list and may perform a PLMN selection procedure.

Figure 15:
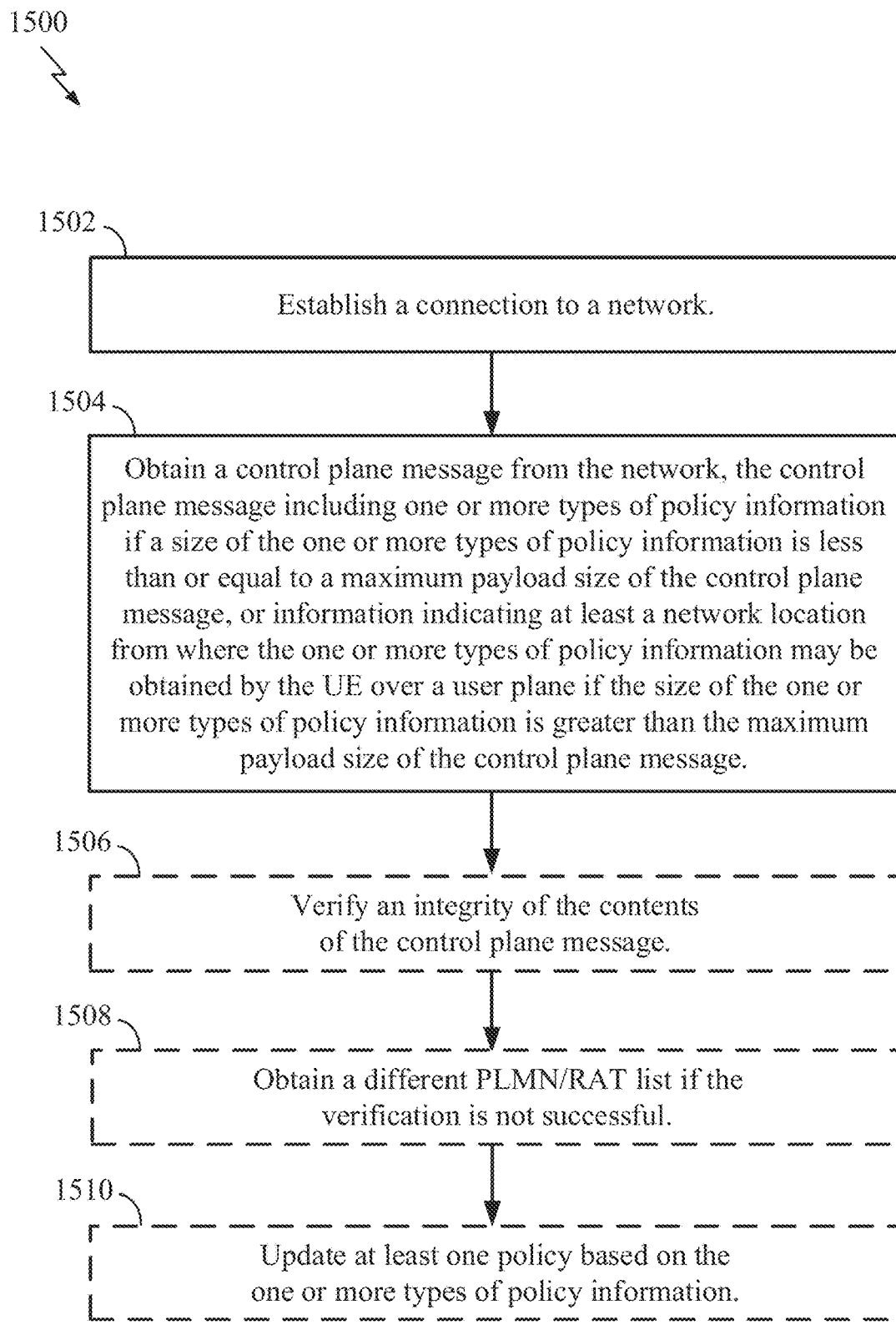
FIG. 15 is a flow chart illustrating an exemplary process for operating a UE according to some aspects of the disclosure.

FIG. 15 is a flow chart illustrating an exemplary process 1500 for operating a UE in accordance with some aspects of the present disclosure. It should be understood that blocks with dashed lines in FIG. 15 represent optional blocks. As described below, some or all illustrated features may be omitted in a particular implementation within the scope of the present disclosure, and some illustrated features may not be required for implementation of all embodiments. In some examples, the process 1500 may be carried out by the UE 400 illustrated in FIG. 4. In some examples, the process 1500 may be carried out by any suitable apparatus or means for carrying out the functions or algorithm described below.

At block 1502, the UE establishes a connection to a network. At block 1504, the UE obtains a control plane message from the network, the control plane message including one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message. At block 1506, the UE optionally verifies an integrity of the contents of the control plane message. At block 1508, the UE optionally obtains a different PLMN/RAT list if the verification (e.g., integrity verification) is not successful. At block 1510, the UE optionally updates at least one policy based on the one or more types of policy information. In some aspects, the UE optionally updates at least one policy based on the one or more types of policy information if the verification (e.g., integrity verification) is successful.

Figure 16:
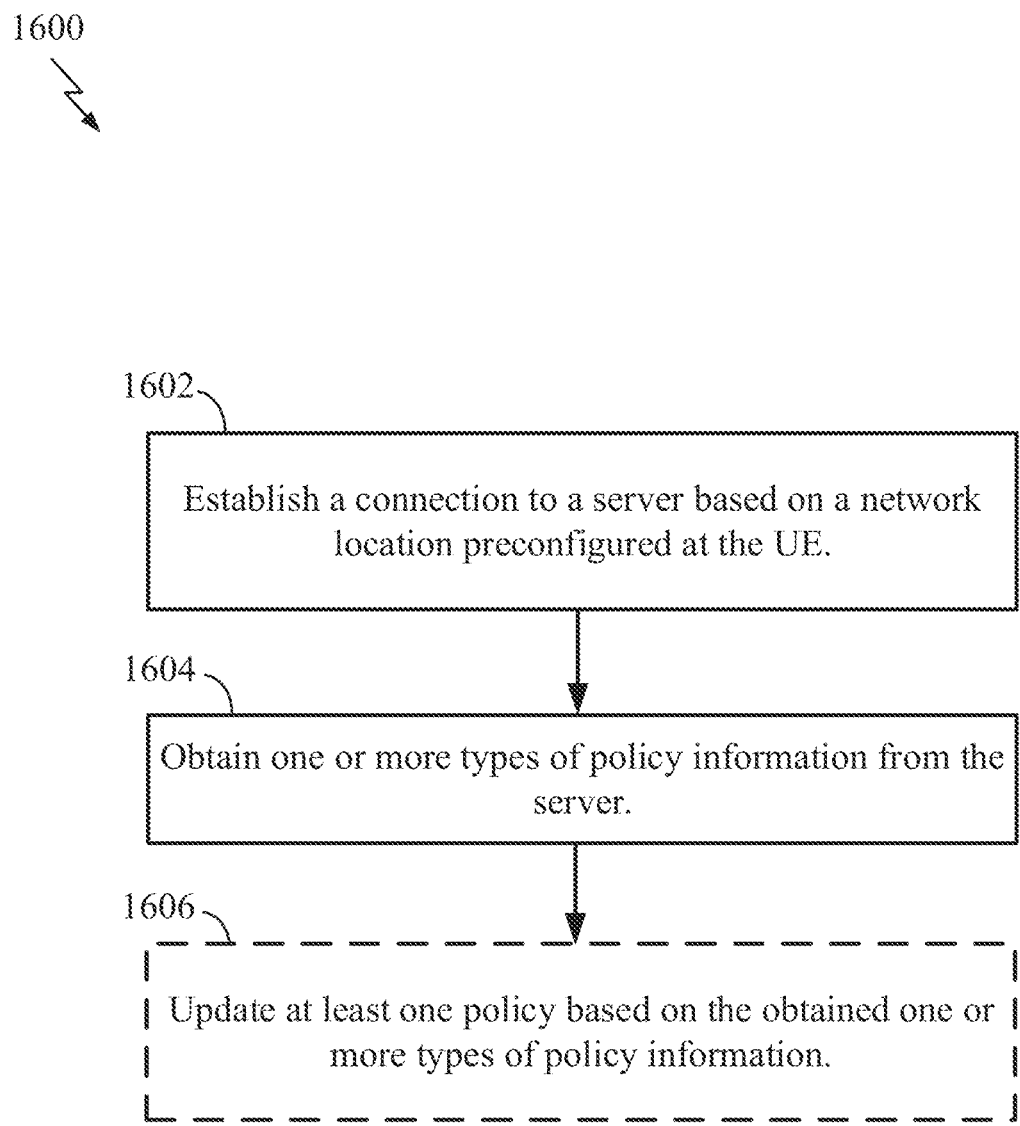
FIG. 16 is a flow chart illustrating an exemplary process for operating a UE according to some aspects of the disclosure.

FIG. 16 is a flow chart illustrating an exemplary process 1600 for operating a UE in accordance with some aspects of the present disclosure. It should be understood that blocks with dashed lines in FIG. 16 represent optional blocks. As described below, some or all illustrated features may be omitted in a particular implementation within the scope of the present disclosure, and some illustrated features may not be required for implementation of all embodiments. In some examples, the process 1600 may be carried out by the UE 400 illustrated in FIG. 4. In some examples, the process 1600 may be carried out by any suitable apparatus or means for carrying out the functions or algorithm described below.

At block 1602, the UE establishes a connection to a server based on a network location preconfigured at the UE. In some aspects, the server may be the core network device 300. At block 1604, the UE obtains one or more types of policy information from the server. At block 1606, the UE optionally updates at least one policy based on the obtained one or more types of policy information.

Figure 17:
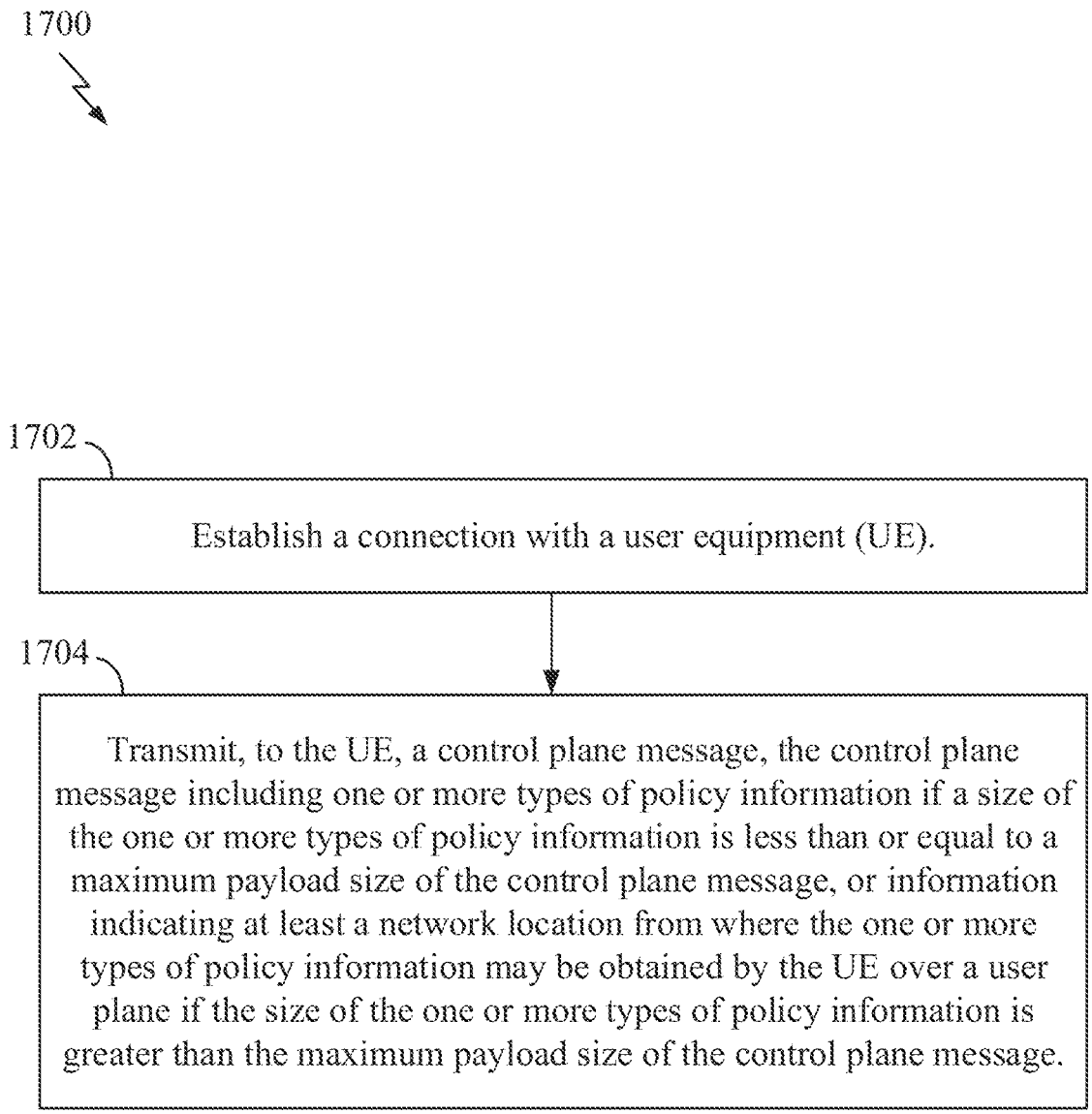
FIG. 17 is a flow chart illustrating an exemplary process for operating a core network device according to some aspects of the disclosure.

FIG. 17 is a flow chart illustrating an exemplary process 1700 for operating a core network device in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the core network device 300 illustrated in FIG. 3. In some examples, the process 1700 may be carried out by any suitable apparatus or means for carrying out the functions or algorithm described below.

At block 1702, the core network device establishes a connection with a UE. At block 1704, the core network device transmits, to the UE, a control plane message, the control plane message including one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message.

In one configuration, the apparatus 300 for wireless communication includes means for establishing a connection with a user equipment and means for transmitting, to the UE, a control plane message, the control plane message including one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message. In one aspect, the aforementioned means may be the processor(s) 304 configured to perform the functions recited by the aforementioned means. In another aspect, the aforementioned means may be a circuit or any apparatus configured to perform the functions recited by the aforementioned means.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described in any one of the FIGS. 1, 2, and/or 3, and utilizing, for example, the processes and/or algorithms described herein in relation to FIG. 17.

In one configuration, the apparatus 400 for wireless communication includes means for establishing a connection to a network, means for obtaining a control plane message from the network, the control plane message including one or more types of policy information if a size of the one or more types of policy information is less than or equal to a maximum payload size of the control plane message, or information indicating at least a network location from where the one or more types of policy information may be obtained by the UE over a user plane if the size of the one or more types of policy information is greater than the maximum payload size of the control plane message, means for verifying an integrity of the contents of the control plane message, means for updating at least one policy based on the one or more types of policy information, means for obtaining a different PLMN/RAT list if the verification is not successful. In one aspect, the aforementioned means may be the processor(s) 404 configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1, 2, and/or 4, and utilizing, for example, the processes and/or algorithms described herein in relation to FIGS. 14-16.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "obtaining" may include one or more actions including, but not limited to, receiving, acquiring, determining, or any combination thereof.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
    establishing a connection to a network; and
    obtaining, at a user equipment (UE) via the connection, a control plane message from the network, the control plane message comprising:
        one or more types of policy information if a size of the one or more types of policy information is less than or equal to a maximum payload size of the control plane message, or
        information indicating at least a network location from where the one or more types of policy information may be obtained by the UE over a user plane if the size of the one or more types of policy information is greater than the maximum payload size of the control plane message.

2. The method of claim 1, further comprising:
    updating, at the UE, at least one policy based on the one or more types of policy information.

3. The method of claim 2, wherein the network location comprises a uniform resource locator (URL), and wherein the updating the at least one policy comprises:
    establishing an Internet Protocol (IP) connection to a server using the URL, and
    obtaining the one or more types of policy information from the server via the IP connection.

4. The method of claim 1, wherein the one or more types of policy information comprises a public land mobile network (PLMN)/radio access technologies (RATs) list, a UE route selection policy (URSP), an access network discovery and selection policy (ANDSP), one or more mobility restrictions, a quality of service (QoS) policy, or some combination thereof.

5. The method of claim 1, wherein the control plane message comprises a non-access stratum (NAS) transport message.

6. The method of claim 1, wherein the control plane message is obtained from a home public land mobile network (HPLMN) or from a visited home public land mobile network (VPLMN).

7. The method of claim 1, wherein the control plane message is provided by a server that implements a policy control function (PCF) in the network.

8. The method of claim 1, wherein the UE has roamed to a visited home public land mobile network (VPLMN), and wherein the one or more types of policy information includes a public land mobile network (PLMN)/radio access technologies (RATs) list provided by a home public land mobile network (HPLMN), the method further comprising:
    verifying, at the UE, an integrity of contents of the control plane message;
    updating, at the UE, at least one policy based on the one or more types of policy information if the verification is successful; and
    obtaining a different PLMN/RAT list if the verification is not successful.

9. The method of claim 8, wherein verifying the integrity of the contents of the control plane message comprises:
    obtaining a message authentication code (MAC) from a MAC field in a payload information element (IE) of the control plane message; and
    using the obtained MAC to determine whether the contents of the control plane message have been modified.

10. An apparatus for wireless communication with a network, comprising:
    a processor;
    a transceiver communicatively coupled to the processor; and
    a memory communicatively coupled to the processor, wherein the processor is configured to:
        establish a connection to the network; and
        obtain, via the connection, a control plane message from the network, the control plane message comprising:
            one or more types of policy information if a size of the one or more types of policy information is less than or equal to a maximum payload size of the control plane message, or
            information indicating at least a network location from where the one or more types of policy information may be obtained by the apparatus over a user plane if the size of the one or more types of policy information is greater than the maximum payload size of the control plane message.

11. The apparatus of claim 10, wherein the processor is further configured to:
    update at least one policy based on the one or more types of policy information.

12. The apparatus of claim 11, wherein the network location comprises a uniform resource locator (URL), and wherein the processor configured to update the at least one policy is further configured to:
    establish an Internet Protocol (IP) connection to a server using the URL, and
    obtain the one or more types of policy information from the server via the IP connection.

13. The apparatus of claim 10, wherein the one or more types of policy information comprises a public land mobile network (PLMN)/radio access technologies (RATs) list, a UE route selection policy (URSP), an access network discovery and selection policy (ANDSP), one or more mobility restrictions, a quality of service (QoS) policy, or some combination thereof.

14. The apparatus of claim 10, wherein the apparatus has roamed to a visited home public land mobile network (VPLMN), and wherein the one or more types of policy information includes a public land mobile network (PLMN)/radio access technologies (RATs) list provided by a home public land mobile network (HPLMN), wherein the processor is further configured to:
    verify an integrity of contents of the control plane message;
    update at least one policy based on the one or more types of policy information if the verification is successful; and
    obtain a different PLMN/RAT list if the verification is not successful.

15. The apparatus of claim 14, wherein the processor configured to verify the integrity of the contents of the control plane message is further configured to:
    obtain a message authentication code (MAC) from a MAC field in a payload information element (IE) of the control plane message; and
    use the obtained MAC to determine whether the contents of the control plane message have been modified.

16. The apparatus of claim 10, wherein the control plane message is provided by a server that implements a policy control function (PCF) in the network.

17. An apparatus for use in a user equipment (UE), the apparatus comprising:

means for establishing a connection to a network; and
means for obtaining, via the connection, a control plane message from the network, the control plane message comprising:
one or more types of policy information if a size of the one or more types of policy information is less than or equal to a maximum payload size of the control plane message, or
information indicating at least a network location from where the one or more types of policy information may be obtained by the UE over a user plane if the size of the one or more types of policy information is greater than the maximum payload size of the control plane message.

18. The apparatus of claim 17, further comprising:
means for updating at least one policy based on the one or more types of policy information.

19. The apparatus of claim 18, wherein the network location comprises a uniform resource locator (URL), and further comprising:
means for establishing an Internet Protocol (IP) connection to a server using the URL, and
means for obtaining the one or more types of policy information from the server via the IP connection.

20. The apparatus of claim 17, wherein the one or more types of policy information comprises a public land mobile network (PLMN)/radio access technologies (RATs) list, a UE route selection policy (URSP), an access network discovery and selection policy (ANDSP), one or more mobility restrictions, a quality of service (QoS) policy, or some combination thereof.

21. The apparatus of claim 17, wherein the control plane message comprises a non-access stratum (NAS) transport message.

22. The apparatus of claim 17, wherein the control plane message is obtained from a home public land mobile network (HPLMN) or from a visited home public land mobile network (VPLMN).

23. The apparatus of claim 17, wherein the control plane message is provided by a server that implements a policy control function (PCF) in the network.

24. The apparatus of claim 17, wherein the UE has roamed to a visited home public land mobile network (VPLMN), and wherein the one or more types of policy information includes a public land mobile network (PLMN)/radio access technologies (RATs) list provided by a home public land mobile network (HPLMN), the apparatus further comprising:
means for verifying an integrity of contents of the control plane message;
means for updating at least one policy based on the one or more types of policy information if the verification is successful; and
means for obtaining a different PLMN/RAT list if the verification is not successful.

25. The apparatus of claim 24, further comprising:
means for obtaining a message authentication code (MAC) from a MAC field in a payload information element (IE) of the control plane message; and
means for using the obtained MAC to determine whether the contents of the control plane message have been modified.

26. An article of manufacture comprising:
a non-transitory computer-readable medium having stored therein instructions executable by a processor of a user equipment (UE) to:
establish a connection to the network; and
obtain, via the connection, a control plane message from the network, the control plane message comprising:
one or more types of policy information if a size of the one or more types of policy information is less than or equal to a maximum payload size of the control plane message, or
information indicating at least a network location from where the one or more types of policy information may be obtained by the apparatus over a user plane if the size of the one or more types of policy information is greater than the maximum payload size of the control plane message.

27. The article of claim 26, wherein the instructions are further executable by the processor to:
update at least one policy based on the one or more types of policy information.

28. The article of claim 27, wherein the network location comprises a uniform resource locator (URL), and the instructions are further executable by the processor to:
establish an Internet Protocol (IP) connection to a server using the URL, and
obtain the one or more types of policy information from the server via the IP connection.

29. The article of claim 26, wherein the one or more types of policy information comprises a public land mobile network (PLMN)/radio access technologies (RATs) list, a UE route selection policy (URSP), an access network discovery and selection policy (ANDSP), one or more mobility restrictions, a quality of service (QoS) policy, or some combination thereof.

30. The article of claim 26, wherein the apparatus has roamed to a visited home public land mobile network (VPLMN), and wherein the one or more types of policy information includes a public land mobile network (PLMN)/radio access technologies (RATs) list provided by a home public land mobile network (HPLMN), wherein the instructions are further executable by the processor to:
verify an integrity of the contents of the control plane message;
update at least one policy based on the one or more types of policy information if the verification is successful; and
obtain a different PLMN/RAT list if the verification is not successful.

31. The article of claim 30, wherein the instructions are further executable by the processor to:
obtain a message authentication code (MAC) from a MAC field in a payload information element (IE) of the control plane message; and
use the obtained MAC to determine whether the contents of the control plane message have been modified.

32. The article of claim 26, wherein the control plane message is provided by a server that implements a policy control function (PCF) in the network.

* * * * *